US009923401B2

(12) United States Patent
Jung

(10) Patent No.: US 9,923,401 B2
(45) Date of Patent: Mar. 20, 2018

(54) ELECTRONIC DEVICE AND BATTERY MANAGEMENT METHOD FOR THE SAME

(71) Applicant: Samsung Electronics Co., Ltd., Suwon-si (KR)

(72) Inventor: Min-Su Jung, Yeosu-si (KR)

(73) Assignee: Samsung Electronics Co., Ltd. (KR)

( * ) Notice: Subject to any disclaimer, the term of this patent is extended or adjusted under 35 U.S.C. 154(b) by 90 days.

(21) Appl. No.: 14/947,425

(22) Filed: Nov. 20, 2015

(65) Prior Publication Data

US 2016/0149418 A1    May 26, 2016

(30) Foreign Application Priority Data

Nov. 20, 2014    (KR) .................. 10-2014-0162861

(51) Int. Cl.
*H02J 7/00*    (2006.01)
*H02J 7/04*    (2006.01)

(52) U.S. Cl.
CPC ............ *H02J 7/007* (2013.01); *H02J 7/0047* (2013.01); *H02J 7/0052* (2013.01); *H02J 7/0091* (2013.01); *H02J 7/047* (2013.01); *H02J 2007/005* (2013.01)

(58) Field of Classification Search
CPC ........ H02J 7/0008; H02J 7/007; H02J 7/0021; H02J 7/0047; H02J 7/0052
USPC ........................................ 320/132, 134, 137
See application file for complete search history.

(56) References Cited

U.S. PATENT DOCUMENTS

| 5,672,953 | A | 9/1997 | Kim | |
| 6,348,777 | B1 * | 2/2002 | Brown | H02J 7/0091 320/137 |
| 6,731,096 | B1 * | 5/2004 | Patino | H02J 7/0091 320/137 |
| 8,674,662 | B2 * | 3/2014 | Chueh | H02J 7/041 320/150 |
| 2007/0075678 | A1 | 4/2007 | Ng et al. | |
| 2013/0134932 | A1 | 5/2013 | Ito et al. | |
| 2013/0221916 | A1 * | 8/2013 | Kelty | B60L 11/187 320/109 |
| 2014/0028267 | A1 | 1/2014 | Lee | |
| 2014/0300321 | A1 | 10/2014 | Kim et al. | |
| 2015/0380954 | A1 * | 12/2015 | Poulton | H02J 7/007 320/106 |

FOREIGN PATENT DOCUMENTS

| KR | 1996-0027134 | 7/1996 |
| KR | 2000-0042000 | 7/2000 |
| KR | 20-0431523 | 11/2006 |

OTHER PUBLICATIONS

European Search Report for Application No. 15195533 dated Mar. 17, 2018.

* cited by examiner

*Primary Examiner* — Paul Dinh
(74) *Attorney, Agent, or Firm* — McAndrews, Held & Malloy, Ltd.

(57) ABSTRACT

Provided is an electronic device including a battery and a processor configured to charge the battery at a second charging rate that is lower than a first charging rate set for the battery according to a battery charging condition. Various embodiments of the present disclosure may also include other embodiments.

21 Claims, 21 Drawing Sheets

ELECTRONIC DEVICE AND BATTERY MANAGEMENT METHOD FOR THE SAME

RELATED APPLICATION(S)

This application claims the benefit under 35 U.S.C. § 119(a) of a Korean patent application filed in the Korean Intellectual Property Office on Nov. 20, 20014 and assigned Serial No. 10-2014-0162861, the entire disclosure of which is incorporated herein by reference.

BACKGROUND

Various embodiments of the present disclosure relate to an electronic device, and more particularly, to battery management for the electronic device.

Various electronic devices use batteries so they can be operated without being connected to external power supplies. These batteries are generally rechargeable batteries that store electric energy in the form of chemical energy and provide electricity when necessary.

During battery charging, an electronic device sets a charging voltage corresponding to a voltage expected from the battery. The battery is then charged by the charging device until full-charge condition is met. The full-charge condition may be when the battery has reached an appropriate voltage and/or the battery is at its full rated capacity.

With present battery technology, a battery lifespan is generally shortened with repeated charging and discharging. That is, actual battery capacity is reduced such that operational time of the battery is reduced even when the electronic device indicates that the battery is 100% charged. The rate at which the battery capacity is reduced is affected by at least temperature, charging voltage and/or charging current. The reduction of the battery capacity may speed up with higher charging voltage and/or higher charging current.

Moreover, if the electronic device is charged with high current and high voltage, there may be safety problems such as battery swelling or explosion.

The electronic device has charging time varying with battery capacity, and when a battery voltage is close to a charging voltage, charging speed may be significantly lowered. For example, in a charging period of about 90% through 100% of the capacity of the battery, charging time with respect to charging capacity increases, degrading charging efficiency and thus increasing a full-charging time.

The above information is presented as background information only to assist in understanding the present disclosure. No determination has been made, and no assertion is made, as to whether any of the above might be applicable as prior art with regard to the present disclosure.

SUMMARY

Various aspects of the present disclosure provide an electronic device and a battery management method for charging a battery in the electronic device, where the battery charging process is managed to reduce battery charging time and/or battery damage.

According to various embodiments of the present disclosure, there is provided an electronic device including a battery and a processor configured to charge the battery at a second charging rate that is lower than a first charging rate set for the battery according to a battery charging condition.

According to various embodiments of the present disclosure, there is provided an electronic device including a battery, a display configured to display a battery management screen for adjusting a charging rate of the battery, and a processor configured to adjust the charging rate of the battery displayed on the battery management screen according to a user input, to set the adjusted charging rate to a second charging rate lower than the first charging rate, and to charge the battery at the set second charging rate.

According to various embodiments of the present disclosure, there is provided a battery management method for an electronic device including determining a second charging rate that is lower than a first charging rate set for the battery according to a battery charging condition and charging the battery at the determined second charging rate.

According to various embodiments of the present disclosure, there is provided a battery management method for an electronic device including displaying a battery management screen for adjusting a charging rate of the battery, adjusting the charging rate of the battery displayed on the battery management screen according to a user input, setting the adjusted charging rate to a second charging rate lower than the first charging rate, and charging the battery at the set second charging rate.

Other aspects, advantages, and salient features of the disclosure will become apparent to those skilled in the art from the following detailed description, which, taken in conjunction with the annexed drawings, discloses exemplary embodiments of the disclosure.

BRIEF DESCRIPTION OF THE DRAWINGS

Throughout the drawings, it should be noted that like reference numbers are used to depict the same or similar elements, features, and structures, wherein.

Throughout the drawings, like reference numerals will be understood to refer to like parts, components, and structures.

DETAILED DESCRIPTION

Figure 1:
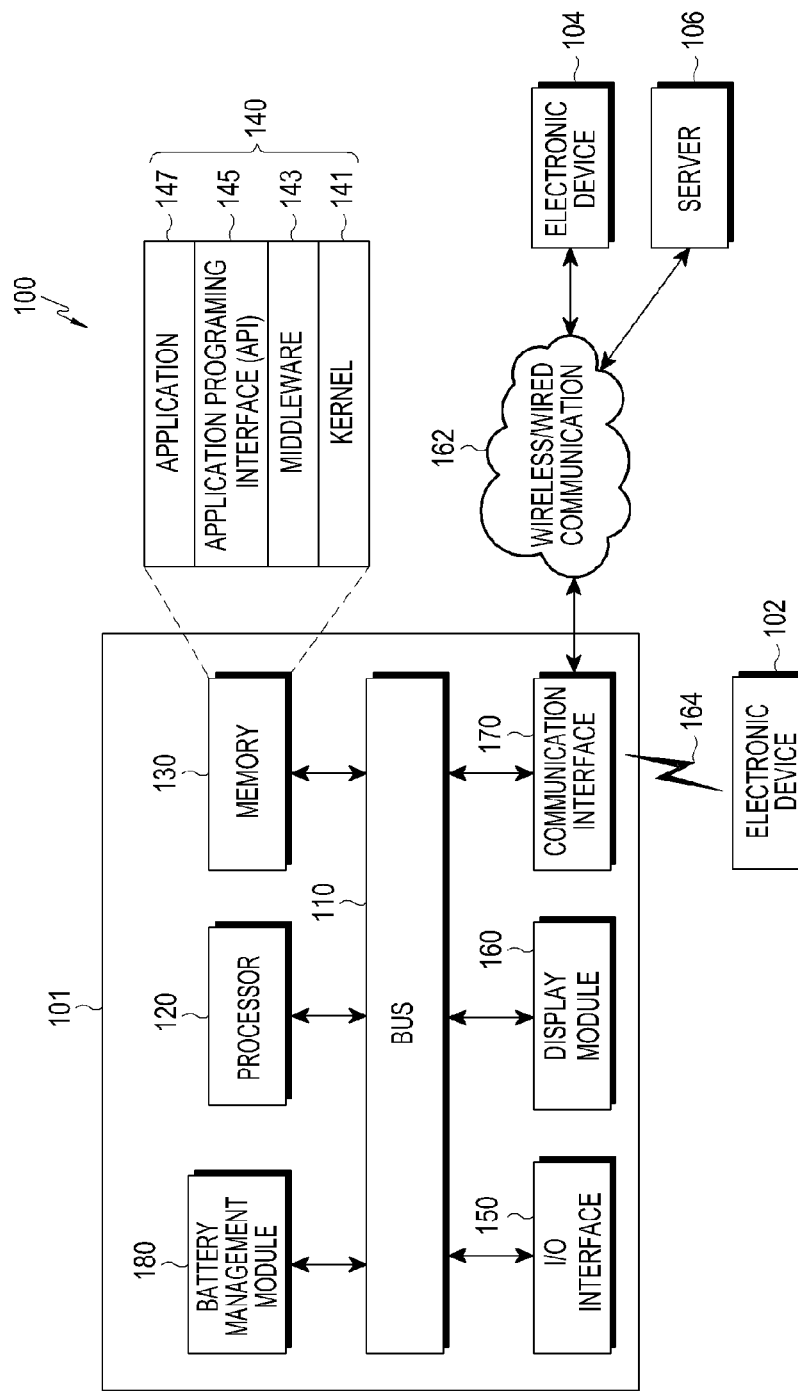
FIG. 1 illustrates a network environment according to an embodiment of the present disclosure.

Hereinafter, the present disclosure will be disclosed with reference to the accompanying drawings. Since various changes may be made to the present disclosure and the present disclosure may have several embodiments, particular embodiments are illustrated in the drawings and a related detailed description will be provided. However, the present disclosure is not intended to limit the present disclosure to particular embodiments, and it should be construed as including various modifications, equivalents, and/or alternatives according to the embodiments of the present disclosure. In regard to the description of the drawings, like reference numerals refer to like elements.

An expression such as "comprising," or "may comprise" may be used in the present disclosure to indicate existence of a corresponding function, operation, or component and does not exclude existence of additional functions, operations, or components. In the present disclosure, the term "comprising" or "having" indicates a characteristic, a number, a step, a component, a part, a part, or a combination thereof, and should not be construed as excluding existence or a possibility of addition of one or more other characteristics, numbers, steps, operations, components, parts, or combinations thereof.

In the present disclosure, an expression such as "A or B," "at least one of A or/and B," or "one or more of A or/and B" may include all possible combinations of together listed items. For example, "A or B," "at least one of A and B," or "one or more of A or B" may indicate the entire of (1) including at least one A, (2) including at least one B, or (3) including at least one A and at least one B.

Expressions such as "first," "second," "primary," or "secondary," used in descriptions of various exemplary embodiments may represent various elements regardless of order and/or importance and do not necessarily indicate relative importance of or specific order of corresponding elements. The expressions may be used for distinguishing one element from another element. For example, a first user device and a second user device may represent different user devices regardless of order or importance. For example, a first element may be referred to as a second element without deviating from the scope of the present disclosure, and similarly, a second element may be referred to as a first element.

When it is described that a first element is "operatively or communicatively coupled" or "connected" to a second element, the first element can be directly connected to the second element or it can be connected to the second element through a third element. However, when it is described that a first element is "directly connected" or "directly coupled" to a second element, it means that there is no intermediate element (such as a third element) between the first element and the second element.

The expression "configured to" used in the present disclosure may be replaced with, for example, "set to," "suitable for," "having the capacity to," "designed to," "adapted to," "made to," or "capable of" according to a situation. The expression "configured to" does not necessarily mean "specifically designed to" do a function by hardware. Alternatively, in some situation, an expression "apparatus configured to" may mean that the apparatus "can" operate together with another apparatus or component. For example, the phrase "a processor configured to perform A, B, and C" may refer to a generic-purpose processor (such as a CPU or an application processor) that can perform a corresponding operation by executing at least one software program stored at a memory device or an exclusive processor (such as an embedded processor) for performing a corresponding operation.

Terms defined in the present disclosure are used for only describing a specific exemplary embodiment and may not have an intention of limiting the scope of other exemplary embodiments. When used in the present disclosure and the appended claims, a singular form may also encompass the plural form unless it is explicitly stated otherwise. All terms including technical terms and scientific terms used here may have the same meaning as generally understood by a person of common skill in the art. Terms defined in a dictionary have the same meaning as or a meaning similar to that of a context of related technology and should not be analyzed to have an ideal or excessively formal meaning unless explicitly defined as such. Terms defined in the present disclosure should not be analyzed to exclude the present exemplary embodiments.

An electronic device according to various embodiments of the present disclosure may be a device including a communication function. For example, the electronic device may include at least one of, for example, a smart phone, a tablet Personal Computer (PC), a mobile phone, a video phone, an electronic book (e-book) reader, a desktop PC, a laptop PC, a netbook computer, a Personal Digital Assistant (PDA), a Portable Multimedia Player (PMP), an MP3 player, mobile medical equipment, a camera, and a wearable device (e.g., smart glasses, Head-Mounted Device (HMD), an electronic cloth, an electronic bracelet, an electronic necklace, an appcessory, an electronic tattoo, a smart mirror, or a smart watch).

According to some embodiments of the present disclosure, the electronic device may be a smart home appliance. The home appliance may include, for example, at least one of a Television (TV), a Digital Video Disk (DVD) player, audio equipment, a refrigerator, an air conditioner, a vacuum cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ or PlayStation™), an electronic dictionary, an electronic key, a camcorder, and an electronic frame.

According to another embodiment of the present disclosure, the electronic device may include at least one of various equipments such as, for example, a blood sugar measurement device, a heartbeat measurement device, a blood pressure measurement device, or a body temperature measurement device, Magnetic Resonance Angiography (MRA), Magnetic Resonance Imaging (MRI), Computed Tomography (CT), an imaging device, or an ultrasonic device, a navigation system, a Global Positioning System (GPS) receiver, an Event Data Recorder (EDR), a Flight Data Recorder (FDR), a vehicle infotainment device, electronic equipment for ships (e.g., navigation system and gyro compass for ships), avionics, a security device, a vehicle head unit, an industrial or home robot, an Automatic Teller's Machine (ATM), a Point of Sales (POS), Internet of things (e.g., electric bulbs, various sensors, electricity or gas meters, sprinkler devices, fire alarm devices, thermostats, streetlights, toasters, exercise machines, hot-water tanks, heaters, boilers, etc.).

According to some embodiments of the present disclosure, the electronic device may include a part of furniture or building/structure, an electronic board, an electronic signature receiving device, a projector, and various measuring instruments (e.g., a water, electricity, gas, or electric wave measuring device). The electronic device according to various embodiments of the present disclosure may be one of the above-listed devices or a combination thereof. The electronic device according to various embodiments of the present disclosure may be a flexible device. It will be obvious to those of ordinary skill in the art that the electronic device according to various embodiments of the present disclosure is not limited to the above-listed devices and may include new electronic devices according to technical development.

Hereinafter, an electronic device according to various embodiments of the present disclosure will be described with reference to the accompanying drawings. Herein, the term "user" used in various embodiments of the present disclosure may refer to a person who uses the electronic device or a device using the electronic device (e.g., an artificial intelligence electronic device).

FIG. 1 illustrates a network environment 100 including an electronic device 101 according to an embodiment of the present disclosure. Referring to FIG. 1, the electronic device 101 may include various components such as a bus 110, a processor 120, a memory 130, an input/output (I/O) interface 150, a display module 160, a communication module 170, and a battery management module 180. According to some embodiments of the present disclosure, the electronic device 101 may omit at least one of the various components and/or include other components.

The bus 110 may include a circuit for interconnecting the processor 120, the memory 130, the input/output (I/O) interface 150, the display module 160, the communication module 170, and the battery management module 180 to allow for communication among these components. Accordingly, the processor 120 can receive a command from other components (for example, the memory 130, the I/O interface 150, the display module 160, the communication module 170, and the battery management module 180) through the bus 110, and execute the command.

The processor 120 may process and execute a software program for executing various functions. The software program is a generic term used to describe instructions and data stored, for example, in memory 130. For example, the processor 120 may be a single-threaded processor or multi-threaded processor. The processor 120 may process a command stored in the memory 130 or another storage device (not shown).

The memory 130 stores a command or data received from or generated by the processor 120 or other components (for example, the input/output interface 150, the display module 160, the communication module 170, and the battery management module 180). The memory 130 may include program modules 140 such as, for example, a kernel 141, a middleware 143, an Application Programming Interface (API) 145, or application(s) 147. These programming modules may include software, firmware, hardware, or a combination of at least two of them.

The kernel 141 controls or manages system resources (for example, the bus 110, the processor 120, and the memory 130) used to execute an operation or a function implemented in the other programming modules, for example, the middleware 143, the API 145, and the application(s) 147. The kernel 141 provides an interface through which the middleware 143, the API 145, or the application(s) 147 accesses a separate component of the electronic device 101 to control the separate component.

The middleware 143 performs a relay operation such that the API 145 or the application(s) 147 exchanges data in communication with the kernel 143. The middleware 143 performs control (for example, scheduling or load balancing) over task requests received from the application(s) 147 by using a method of assigning a priority for using a system resource (for example, the bus 110, the processor 120, or the memory 130) of the electronic device 101 to, for example, at least one of the application(s) 147.

The API 145 is an interface through which the application(s) 147 controls a function provided by the kernel 141 or the middleware 143, and may include at least one interface or function (for example, command) for, for example, file control, window control, image processing or character control.

According to various embodiments of the present disclosure, the application(s) 147 may include, for example, a Short Message Service (SMS)/Multimedia Messaging Service (MMS) application, an e-mail application, a calendar application, an alarm application, a healthcare application (for example, an application for measuring an exercise volume or a blood sugar level), and/or an environment information application (for example, an application for providing air pressure, humidity, or temperature information). Additionally or alternatively, the application 134 may be an application associated with information exchange between an electronic device 102 and an external electronic device 104. The application associated with information exchange may include a notification relay application for relaying particular information to the external electronic device 104 or a device management application for managing the external electronic device 104.

For example, the notification relay application may include a function of relaying notification information generated in another application (for example, the SMS/MMS application, the e-mail application, the healthcare management application, or the environment information application) of the electronic device 102 to the external electronic device 104. Additionally or alternatively, the notification relay application may, for example, receive notification information from the external electronic device 104 and provide the notification information to a user. The device management application may manage (for example, install, delete, or update) a function of at least a part of the external electronic device 104 communicating with the electronic device 102 (for example, turn-on/turn-off of the external electronic device (or a part thereof) or brightness (or resolution) adjustment of the display), an application operating on the external electronic device 104, or a service (for example, a call service or a message service) provided on the external electronic device 104.

According to various embodiments of the present disclosure, the application 134 may include an application designated according to an attribute (for example, a type) of the external electronic device 104. For example, if the external electronic device 104 is an MP3 player, the application(s) 147 may include an application associated with music playback. Similarly, if the external electronic device 104 is a mobile medical device, the application(s) 147 may include an application associated with healthcare. According to some embodiments of the present disclosure, the application(s) 147 may include at least one of an application designated in the electronic device 101 and an application received from another electronic device (for example, a server 106 or the external electronic device 104).

The I/O interface 150 may deliver a command or data from a user through an input/output device (for example, a sensor, a keyboard, or a touch screen) to the processor 120, the memory 130, the communication module 170, or the battery management module 180, for example, through the bus 110. For example, the I/O interface 150 may provide data regarding a user's touch input through the touch screen to the processor 120. The I/O interface 150 may output the command or data, received from the processor 120, the memory 130, the communication module 170, or the battery management module 180 through the bus 110, through an I/O device (for example, a speaker or a display). For example, the I/O interface 150 may output voice data processed by the processor 120 to the user through a speaker. The display module 160 may display various contents (for example, a text, an image, video, an icon, or a symbol) to users. In addition, according to various embodiments of the present disclosure, the display module 160 may display an input window or an input pad for inputting various texts, numbers, and symbols onto the input window on the screen in various manners.

The communication module 170 may set up communication between, for example, the electronic device 101 and an external device (for example, the external electronic device 104 or the server 106). For example, the communication module 170 may be connected to a network 162 through wireless or wired communication to communicate with the external device. The wireless communication may include at least one of, for example, WiFi, Bluetooth (BT), Near Field Communication (NFC), Global Positioning System (GPS), or cellular communication (for example, Long Term Evolution (LTE), LTE-Advanced (LTE-A), Code Division Multiple Access (CDMA), Wideband CDMA (WCDMA), a Universal Mobile Telecommunication System (UMTS), Wireless Broadband (WiBro), and Global System for Mobile Communications (GSM)). The wired communication may include at least one of, for example, a USB (universal serial bus), a High Definition Multimedia Interface (HDMI), a Recommended Standard (RS)-232, and a Plain Old Telephone Service (POTS). The communication module 170 may support any one or more of communication schemes presently known as the above-described communication schemes or which may be developed in the future.

According to various embodiments of the present disclosure, the network 162 may be, for example, a computer network, the Internet, the Internet of things, or a telephone network. According to various embodiments of the present disclosure, a protocol (for example, a transport layer protocol, a data link layer protocol, or a physical layer protocol) for communication between the electronic device 101 and an external electronic device may be supported in at least one of the application(s) 147, the API 145, the middleware 143, the kernel 141, and the communication module 170.

Although the electronic device 101 includes the communication module 170 to communicate with at least one of the external electronic device 104 and the server 106 through the network 162 in FIG. 1, the electronic device 101 may be implemented to independently operate in the electronic device 101 without a separate communication function according to various embodiments of the present disclosure.

According to various embodiments of the present disclosure, the server 106 may perform at least one function to support operation of the electronic device 101. For example, the server 106 may include a battery management server module (not shown) capable of supporting the processor 120 implemented in the electronic device 101. The battery management server module may include at least one element of the battery management module 180 to perform (or substitute for) at least one of functions implemented by the battery management module 180.

The battery management module 180 may process at least a part of information obtained from, for example, the processor 120, the memory 130, the I/O interface 150, the display module 160, and/or the communication module 170, and provide the obtained information to the user.

The battery management module 180 is illustrated as a module separated from the processor 120 in FIG. 1, but embodiments of the disclosure need not be so limited. The entire function of the battery management module 180 may be included in the processor 120, the memory 130, the I/O interface 150, the display module 160, and/or the communication module 170.

The battery management module 180 may process at least a part of information obtained from other elements (e.g., the processor 120, the memory 130, the I/O interface 150, or the communication module 170), and provide the processed part to a user in various ways. For example, the battery management module 180 may control at least some function of the electronic device 101 to enable the electronic device 101 to interwork with the external electronic device 104 or the server 106 using at least in part the processor 120 or independently of the processor 120. With reference to FIGS. 2 through 16, additional information regarding the battery management module 180 will be provided.

Figure 2:
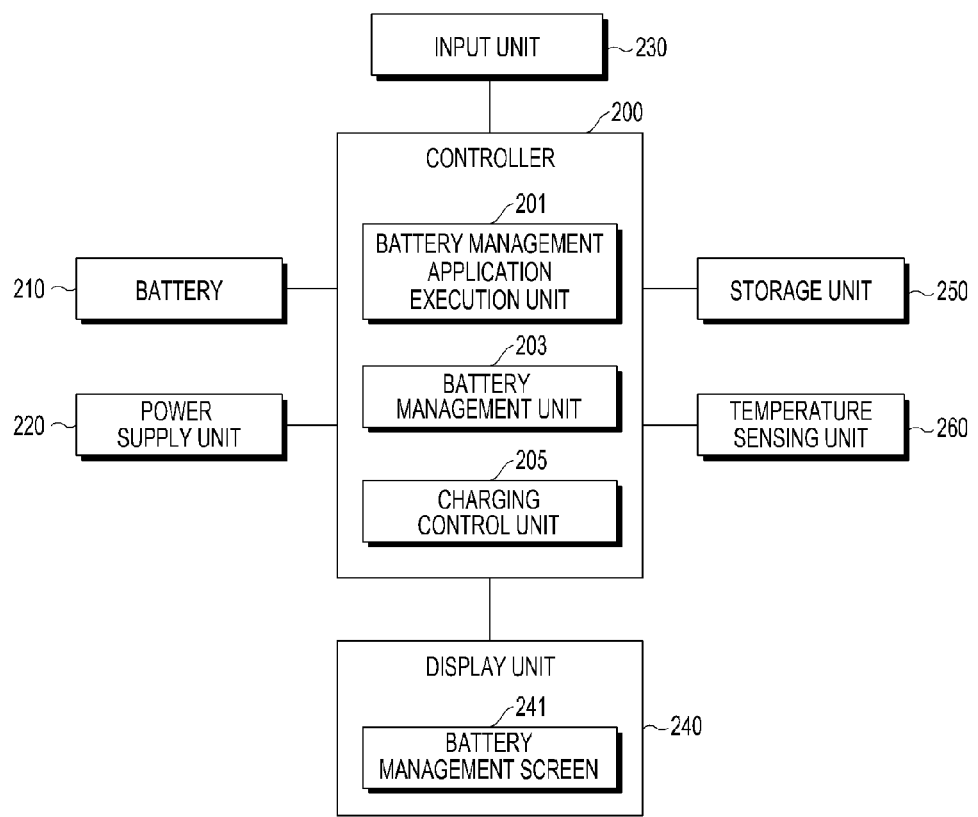
FIG. 2 illustrates an example of an electronic device according to an embodiment of the present disclosure.

FIG. 2 is a block diagram of an electronic device according to various embodiments of the present disclosure. For convenience, the battery management module 180 will be described as being implemented in the processor 120 of FIG. 1. At least one element included in a controller 200 of FIG. 2 may be included in the battery management module 180 or the processor 120 of FIG. 1.

Referring to FIG. 2, the electronic device (for example, the electronic device 101 of FIG. 1) may include at least one of the controller 200, a battery 210, a power supply unit 220, an input unit 230, a display unit 240, a storage unit 250, and a temperature sensing unit 260.

The controller 200 may include a battery management application execution unit 201, a battery management unit 203, and a charging control unit 205. The controller 200 may have a configuration that is the same as or similar to the processor 120 illustrated in FIG. 1.

According to various embodiments of the present disclosure, the battery management application execution unit 201 may execute at least one of an environment setting application and a battery management application upon external power being provided to the battery or at the request of the user, and may control the display unit 240 to display a battery management screen 241 corresponding to execution of an application. The battery management application execution unit 201 may receive information related to charging (e.g., current remaining battery capacity, a first charging rate, a second charging rate (which may be a recommended charging rate or a charging rate based on user input), expected charging time, elapsed charging time, and information related to active state of the battery 210 from the battery management unit 203, and control the received information to be displayed on the battery management screen 241.

According to various embodiments of the present disclosure, the battery management application execution unit 201 may provide a menu to allow the user to select a charging mode on the battery management screen 241. The charging mode may be, for example, a first charging mode for charging the battery 210 according to a first full-charging condition, or a second charging mode for charging the battery 210 according to a second full-charging condition based on the second charging rate. The first full-charging condition, which may be a preset default, refers to a full-charging state (fully charged state) with respect to a fully rated battery capacity or a full-charging state (for example, the first charging rate) with respect to less than a fully rated battery capacity. For example, the battery 210 may be only charged to 90% of the fully rated battery capacity to prevent accidentally over-charging beyond the fully rated battery capacity. Over-charging a battery may lead to damage to the battery or the electronic device.

According to various embodiments of the present disclosure, in the first charging mode, battery charging may be terminated if a battery capacity meets the first full-charging condition.

According to various embodiments of the present disclosure, the second charging mode may include, for example, a first setting mode and/or a second setting mode. The first setting mode is a monde for changing the first full-charging condition to the second full-charging condition using the recommended charging rate. The second setting mode is mode for changing the first full-charging condition to the second full-charging condition using the charging rate that is based on user input. The second full-charging condition changed in the second charging mode may indicate a condition for terminating a charging operation of the battery, when a current charged capacity of the battery reaches the second charge rate. A battery charging condition may be based on, for example, at least one of a temperature or a user input sensed in an electronic device.

According to various embodiments of the present disclosure, the recommended charging rate is, for example, the second charging rate that may be set lower than the first charging rate. The recommended charging rate may be set, depending on temperature, between a charging rate (e.g., 75%) when a constant current (CC) ends, that is, when the constant current changes to a different current value, and a charging rate (e.g., 90%) when a state of charge is at a cutoff voltage.

According to various embodiments of the present disclosure, the user-set charging rate may be, for example, the second charging rate that may be set lower than the first charging rate. The user-set charging rate may be set by the user adjusting an adjustment bar displayed on the battery management screen 241. This is explained further with respect to FIG. 19. According to various embodiments of the present disclosure, the user-set charging rate may be lower than a charging rate of 100% or lower than a charging rate (e.g., 90%) when the battery 210 is at a cutoff voltage. The first charging rate may include a charging rate corresponding to a charging state in which the capacity of the battery 210 is charged at 100% and a charging rate higher than a charging rate corresponding to the cutoff voltage.

According to various embodiments of the present disclosure, the battery management unit 203 performs a control operation for managing the battery 210. The battery management unit 203 periodically collects information related to an active state of the battery 210 to check the active state of the battery 210. The information related to the active state of the battery 210 may include at least one of a remaining battery capacity, a desired charged battery capacity, a battery connection state, a battery voltage, battery damage, and whether the battery 210 is connected to an power supply.

The battery management unit 203 determines whether the currently charged amount of the battery 210 has reached the second charging rate (for example, the recommended charging rate or the charging rate based on the user input), that is, meets a second full-charging condition.

According to various embodiments of the present disclosure, the battery management unit 203 calculates the recommended charging rate based on a sensed temperature by using information related to the active state of the battery 210 and set reference information. The set reference information may be, for example, maximum battery temperature and charging voltage. The battery management unit 203 changes the first full-charging condition using the calculated recommended charging rate, and delivers information related to the changed second full-charging condition to the battery management application execution unit 201.

According to various embodiments of the present disclosure, the battery management unit 203 identifies the charging rate based on the user input and changes the first full-charging condition to the second full-charging condition based on the charging rate based on the user input. The battery management unit 203 delivers the changed second full-charging condition to the battery management application execution unit 201.

According to various embodiments of the present disclosure, the battery management unit 203 periodically identifies information related to active state of the battery 210 and sends a command signal regarding power supply for charging of the battery 210 or power interruption to terminate charging of the battery 210 to the charging control unit 205 based on the identified information. The battery management unit 203 receives from the charging control unit 205.

According to various embodiments of the present disclosure, the charging control unit 205 determines power supply or power interruption and delivers command signal for the power supply or power interruption received from the battery management unit 203 to the power supply unit 220.

According to various embodiments of the present disclosure, the controller 220 may further include an operation execution unit (not shown) that executes an operation of an electronic device. The operation execution unit controls execution of an operation corresponding to a user input or a sensed input. According to various embodiments of the present disclosure, the operation execution unit controls the display unit 240 to display an execution screen and information corresponding to execution of the operation, or controls various operations of the electronic device (e.g., vibration generation, sound output through a speaker, an operation related to a camera module, and so forth).

According to various embodiments of the present disclosure, at least some elements of the controller 200 may be included in the battery management module 180 illustrated in FIG. 1. According to various embodiments of the present disclosure, the controller 200 may be a part of the processor 120 illustrated in FIG. 1, and may include, for example, a combination of one or more of hardware, software, and firmware.

According to various embodiments of the present disclosure, at least some elements of the controller 200 may include at least one of the processor 120, the memory 130, and the bus 110. The controller 200 may also include a software/firmware/data/etc. that is stored in, for example, the memory 130, which can be processed by the processor 120 to perform a function for an electronic device.

According to various embodiments of the present disclosure, the battery 210 is mounted on an electronic device to supply power for the electronic device, and is connected with the controller 200 through a connector. The battery 210 may use, for example, a lithium (Li)-ion or Li-ion polymer battery, and may also use other types of batteries.

According to various embodiments of the present disclosure, the power supply unit 220 may supply power to the battery 210 and may include at least one of a connector (not shown), a connection terminal (not shown), and a connection interface (not shown) for connection with an external power supply device (not shown). The power supply unit 220 receives a power supply or power interruption command signal from the controller 200 and supplies or interrupts power from an external power supply device to the battery 210 according to the received command signal. The power supply unit 220 may be part of, for example, the I/O interface 150 of FIG. 1.

According to various embodiments of the present disclosure, the input unit 230 delivers various information input by the user, and various function settings and function controls input to the electronic device to the controller 200. The input unit 230 supports a user input for executing an application that supports a particular function. The input unit 230 may include at least one of a key input means, such as a keyboard or a keypad, a touch input means such as a touch sensor or a touch pad, a voice input means, various sensors, and a camera, and may also include a gesture input means. The input unit 230 may include any type of input means that are currently developed or may be developed in the future.

According to various embodiments of the present disclosure, the input unit 230 receives information input by the user through a touch panel of the display unit 240, that is, information input by the user through a battery management screen 241, and delivers at least some of that information to the controller 200.

According to various embodiments of the present disclosure, the input unit 230 may correspond to the I/O interface 150 of FIG. 1.

According to various embodiments of the present disclosure, the display unit 240 displays operation execution information and results of the operation execution according to operation control from an operation execution unit (not shown). The display unit 240 may also display an executable application list or a result of execution of a set application.

According to various embodiments of the present disclosure, the display unit 240 displays an execution screen corresponding to execution of at least one of the environment setting application and the battery management application, that is, the battery management screen 241, under control of the battery management application execution unit 201. The display unit 240 may display, for example, information related to the recommended charging rate calculated by the battery management unit 203, information related to a full-charging condition (e.g., an initial full-charging condition or a changed full-charging condition), and information related to a battery state on the battery management screen 241. The display unit 240 may display an updated full-charging condition on the battery management screen 241.

According to various embodiments of the present disclosure, the display 240 displays the battery management screen 241 corresponding to user's menu selection and displays information related to execution of battery charging in a user-selected charging mode corresponding to user's selection on the battery management screen 241. If at least one of the current battery temperature and charging voltage exceeds set reference information, the display unit 240 displays a message indicating the risk of damage during battery charging on the battery management screen 241.

According to various embodiments of the present disclosure, the display unit 240 may correspond to the display module 160 of FIG. 1. According to various embodiments of the present disclosure, if the display module 160 of the electronic device 101 of FIG. 1 is implemented as a touch screen, the input unit 230 and/or the display unit 240 may correspond to the touch screen. If implemented with the input unit 230 in the form of a touch screen, the display unit 240 may display various information generated by a user's touch operation.

According to various embodiments of the present disclosure, the display unit 240 may include at least one of a liquid crystal display (LCD), a thin film transistor (TFT)-LCD, an organic light emitting diode (OLED), an LED, an active matrix organic LED (AMOLED), a flexible display, and a three-dimensional (3D) display, some of which may be of a transparent type or a light-transmissive type to allow the user to see outside therethrough and may be configured as a transparent display including a transparent OLED (TOLED).

According to various embodiments of the present disclosure, the storage unit 250 may temporarily store various data generated during execution of a program as well as a program necessary for execution of a function according to various embodiments of the present disclosure. The storage unit 250 may comprise a program region and a data region. The program region may store, for example, executable instructions or programs such as an operating system (OS) for the electronic device. The data region may store data transmitted and received as well as generated, in addition to data originally stored on the electronic device according to various embodiments of the present disclosure.

According to various embodiments of the present disclosure, the storage unit 250 may correspond to the memory 130 of FIG. 1. The storage unit 250 may include, for example, a flash memory, a hard disk, a multimedia card micro-type memory (e.g., a secure digital (SD) or extreme digital (XD) memory), a RAM, and a ROM.

According to various embodiments of the present disclosure, the temperature sensing unit 260 may deliver a current temperature sensed by at least one temperature sensor or program that senses a temperature of the battery 210 inside the electronic device to the controller 200. The temperature sensing unit 260 may be a part of, for example, the I/O interface 150 of FIG. 1.

Main elements of the electronic device have been described with reference to FIG. 2. However, all the elements illustrated in FIG. 2 are not essential elements, and some parts, if not all, such as, for example, the battery management module 180 of the electronic device 101, may be implemented in other ways. For example, the battery management module 180 of the electronic device 101 may further include a sound source output unit (not shown) that may convert an electric signal into sound and output the sound.

Positions of the main elements of the electronic device (for example, the battery management module 180 of the electronic device 101) illustrated in FIG. 2 may be changed according to various embodiments of the present disclosure. Elements of the controller 200 are not limited to the elements illustrated in FIG. 2, and may also include various elements for performing various functions.

According to any one of various embodiments of the present disclosure, an electronic device may include a battery and a processor configured to charge the battery at a second charging rate that is lower than a first charging rate set for the battery according to a battery charging condition.

According to various embodiments of the present disclosure, the battery charging condition may be determined based on a temperature sensed by the electronic device.

According to various embodiments of the present disclosure, the processor may identify a current temperature of the battery from the sensed temperature and determine the second charging rate by using at least one of a battery charging rate when a charging current is changed, a battery charging rate at a cutoff voltage, and the identified current temperature of the battery.

According to various embodiments of the present disclosure, the processor may interrupt power supplied to the battery if a capacity of the battery reaches the second charging rate.

According to various embodiments of the present disclosure, the processor may display at least one of information related to the charging of the battery, information related to an expected charging time, and information related to an elapsed charging time when charging the battery at the second charging rate.

According to various embodiments of the present disclosure, if the temperature of the battery is changed by a reference temperature change value or more during the charging of the battery, the processor may change the second charging rate according to the changed temperature of the battery and charge the battery at the changed second charging rate.

According to various embodiments of the present disclosure, the processor may interrupt power supplied to the battery if the current temperature of the battery exceeds a set maximum temperature.

According to various embodiments of the present disclosure, if the power supplied to the battery is interrupted when the capacity of the battery does not reach the second charging rate, the processor may switch to a power supply wait state, and if the power is supplied again to the battery in the power supply wait state, the processor may re-determine the second charging rate and re-charge the battery at the determined second charging rate.

According to various embodiments of the present disclosure, during the charging of the battery, the processor may receive, from a user, an input of a third charging rate higher than the second charging rate through adjustment of a charging rate of the battery displayed on a battery management screen, and further charge the battery at the input third charging rate.

According to any one of various embodiments of the present disclosure, an electronic device may include a battery, a display configured to display a battery management screen for adjusting a charging rate of the battery, and a processor configured to adjust the charging rate of the battery displayed on the battery management screen according to a user input, to set the adjusted charging rate to a second charging rate lower than the first charging rate, and to charge the battery at the set second charging rate.

According to various embodiments of the present disclosure, the processor may interrupt power supplied to the battery if a capacity of the battery reaches the second charging rate.

According to various embodiments of the present disclosure, the processor may display at least one of information related to the charging of the battery, information related to an expected charging time, and information related to an elapsed charging time on a battery management screen when charging the battery at the second charging rate.

Hereinafter, a battery management method for an electronic device according to various embodiments of the present disclosure will be described in detail with reference to the accompanying drawings.

Figure 3:
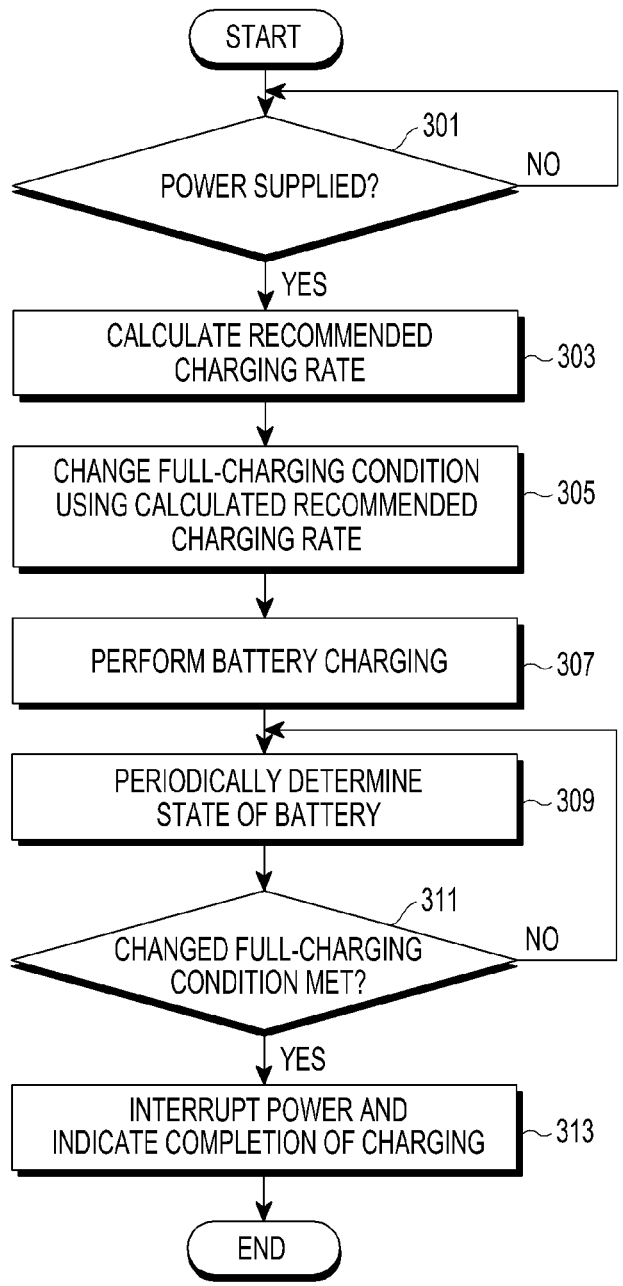
FIG. 3 illustrates an operation procedure of an electronic device according to various embodiments of the present disclosure.
Figures 4A, 4B:
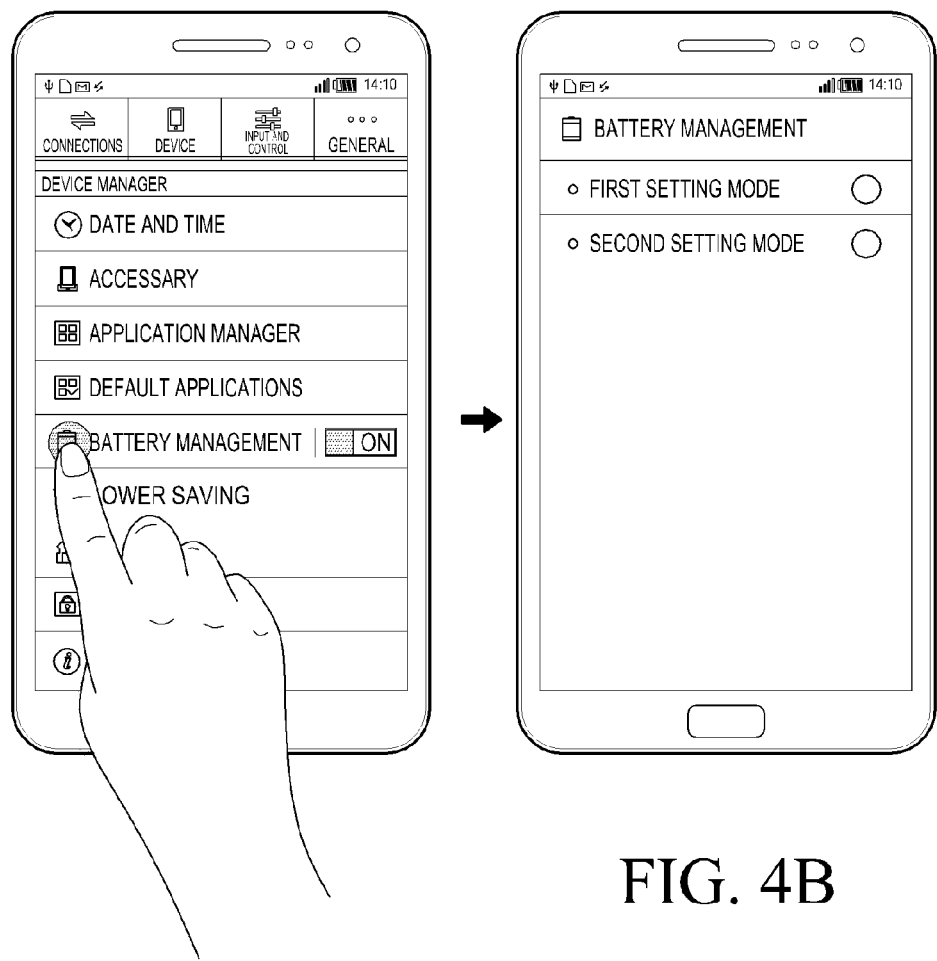
FIGS. 4A and 4B illustrate a battery management screen displayed on an electronic device according to various embodiments of the present disclosure.
Figures 5A, 5B:
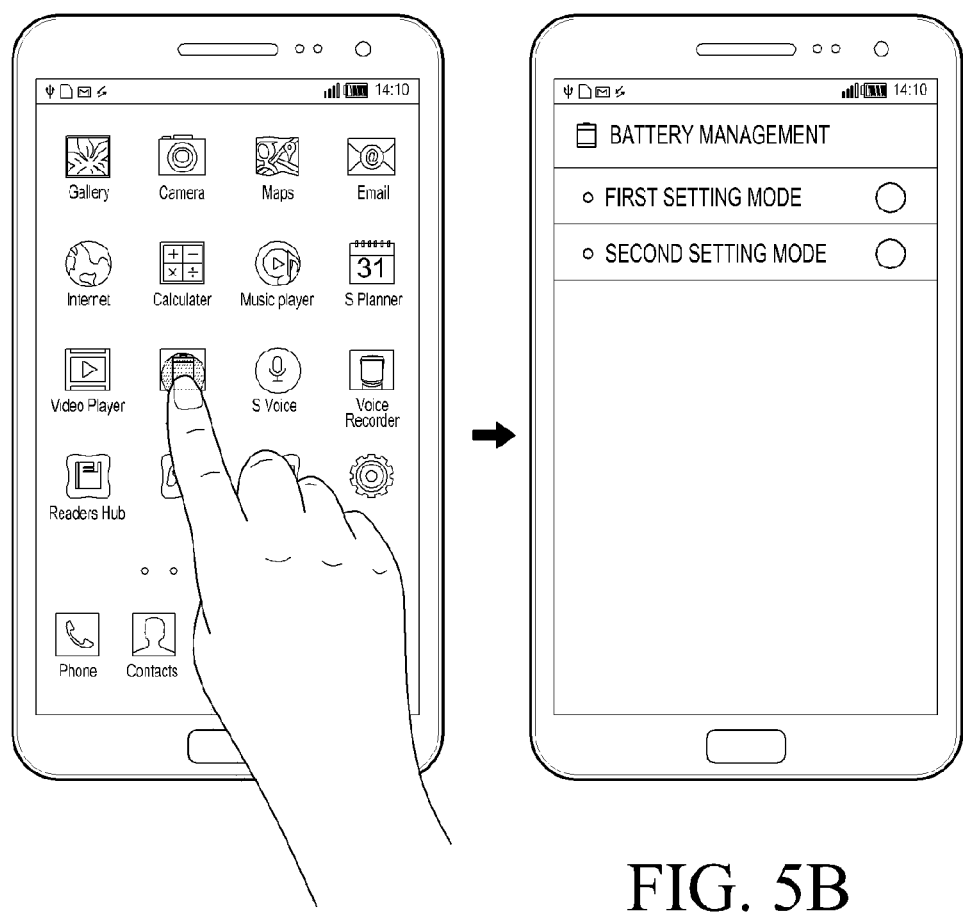
FIGS. 5A and 5B illustrate a battery management screen displayed on an electronic device according to various embodiments of the present disclosure.

FIG. 3 illustrates an operation procedure of an electronic device according to various embodiments of the present disclosure.

Referring to FIG. 3, in operation 301, according to various embodiments of the present disclosure, an electronic device (for example, the electronic device 101 of FIG. 1) determines whether a battery (for example, the battery 210 of FIG. 2) is supplied with power. If the battery is supplied with external power, the electronic device performs operation 303; otherwise, if the battery is not supplied with external power, the electronic device performs operation 301 again.

In operation 303, the electronic device determines a recommended charging rate (e.g., a second charging rate) that may be lower than a first charging rate that is set for the battery according to a battery charging condition, to minimize a battery charging time. The electronic device senses current battery temperature and determines a recommended charging rate based on a charging cutoff voltage and the battery temperature, taking into account the battery capacity corresponding to a point in time when a charging current is changed. Accordingly, the current charging rate may be the recommended charging rate that may be lower than the first charging rate, and is given by:

$$\text{Recommended Charging Rate} = cc + (ctv - (ctv \times (ct-lt)/(ht-lt))) \quad (1),$$

where cc represents a charging rate (e.g., 75%) at a point when a constant current period (cc period) ends, and ctv represents a charging rate difference between the end point of the cc period and a cutoff voltage point. If a charging rate at the cutoff voltage point is at, for example, 90% then ctv would be 15%. lt represents a set reference temperature (e.g., +15° C.), ct represents a determined current battery temperature (e.g., +30° C.), and ht represents a set maximum temperature (e.g., +60° C.). The recommended charging rate calculated using Equation (1) may be, for example, 85%.

The electronic device changes a full-charging condition using the calculated recommended charging rate in operation 305, and performs battery charging in operation 307.

In operation 309, the electronic device periodically determines a state of a battery to determine various parameters such as, for example, current battery capacity, whether external power is supplied to the battery, elapsed charging time, and/or battery temperature.

In operation 311, the electronic device determines whether the current battery capacity meets the second full-charging condition, which may be, for example, the calculated recommended charging rate. If the current battery capacity does not meet the second full-charging condition, the electronic device performs operation 309; otherwise, if the current battery capacity meets the changed second full-charging condition, the electronic device performs operation 313.

In operation 313, the electronic device interrupts power supplied to the battery because the current battery capacity is at the second full-charging condition. The electronic device may also display a notification message indicating that charging has been completed on the battery management screen.

Various embodiments of this disclosure may change the operations illustrated in FIG. 3 to add one or more operation, delete one or more operation, and/or change one or more operation. The operations illustrated in FIG. 3 may be executed in the illustrated order, or the order of the operations may be changed by various embodiments of this disclosure according to design/implementation purposes.

According to any one of various embodiments of the present disclosure, a battery management method for an electronic device may include determining a second charging rate that is lower than a first charging rate set for the battery according to a battery charging condition and charging the battery at the determined second charging rate.

According to various embodiments of the present disclosure, the battery management method may further include determining the battery charging condition based on a temperature sensed by the electronic device and displaying at least one of information related to the charging of the battery, information related to an expected charging time, and information related to an elapsed charging time during the charging of the battery.

According to various embodiments of the present disclosure, the battery management method may further include sensing an ambient temperature of the battery using at least one sensor mounted in the electronic device.

According to various embodiments of the present disclosure, the determining of the second charging rate that is lower than the first charging rate set for the battery may include identifying a current temperature of the battery from the sensed temperature and determining the second charging rate by using at least one of a battery charging rate when a charging current is changed, a battery charging rate at a full-charging cutoff voltage, and the identified current temperature of the battery.

According to various embodiments of the present disclosure, the charging of the battery at the determined second charging rate may include identifying a battery capacity, charging the battery until the battery capacity reaches the second charging rate, and interrupting power supplied to the battery if the battery capacity reaches the second charging rate.

According to various embodiments of the present disclosure, the charging of the battery at the determined second charging rate may include changing the second charging rate according to a changed temperature of the battery if the temperature of the battery is changed by a reference temperature change value or more during the charging of the battery and charging the battery at the changed second charging rate.

According to various embodiments of the present disclosure, the charging of the battery at the determined second charging rate may include switching to a power supply wait state if the power supplied to the battery is interrupted when the battery capacity does not reach the second charging rate, re-determining the second charging rate if the power is supplied again to the battery in the power supply wait state, and re-charging the battery at the determined second charging rate.

According to various embodiments of the present disclosure, the charging of the battery at the determined second charging rate may include receiving, from a user, an input of a third charging rate higher than the second charging rate through adjustment of a charging rate of the battery displayed on a battery management screen during the charging of the battery and further charging the battery at the input third charging rate.

According to any one of various embodiments of the present disclosure, a battery management method for an electronic device may include displaying a battery management screen for adjusting a charging rate of the battery, adjusting the charging rate of the battery displayed on the battery management screen according to a user input, setting the adjusted charging rate to a second charging rate lower than the first charging rate, and charging the battery at the set second charging rate.

According to various embodiments of the present disclosure, the charging of the battery at the set second charging rate may include identifying the battery capacity, charging the battery until the battery capacity reaches the second charging rate, and interrupting power supplied to the battery if the battery capacity reaches the second charging rate.

According to various embodiments of the present disclosure, the battery management method may further include displaying at least one of information related to the charging of the battery, information related to an expected charging time, and information related to an elapsed charging time on the battery management screen during the charging of the battery.

Based on the above-described structure and operations of the electronic device, various embodiments of the present disclosure will be described in detail. In the following description, for convenience, according to various embodiments of the present disclosure, the electronic device may be, for example, the electronic device 101 of FIG. 1, and the battery may be, for example, the battery 210 of FIG. 2.

FIGS. 4A and 4B and FIGS. 5A and 5B illustrate battery management screens displayed on an electronic device according to various embodiments of the present disclosure. Referring to FIGS. 4A and 4B and FIGS. 5A and 5B, an electronic device according to various embodiments of the present disclosure executes an environment setting or battery management application to display a menu for battery management on an execution screen (hereinafter, referred to as a battery management screen). Once the user selects the battery management menu displayed on the battery management screen, the electronic device displays related information for selecting at least one setting mode for battery charging on the battery management screen.

Figure 6:
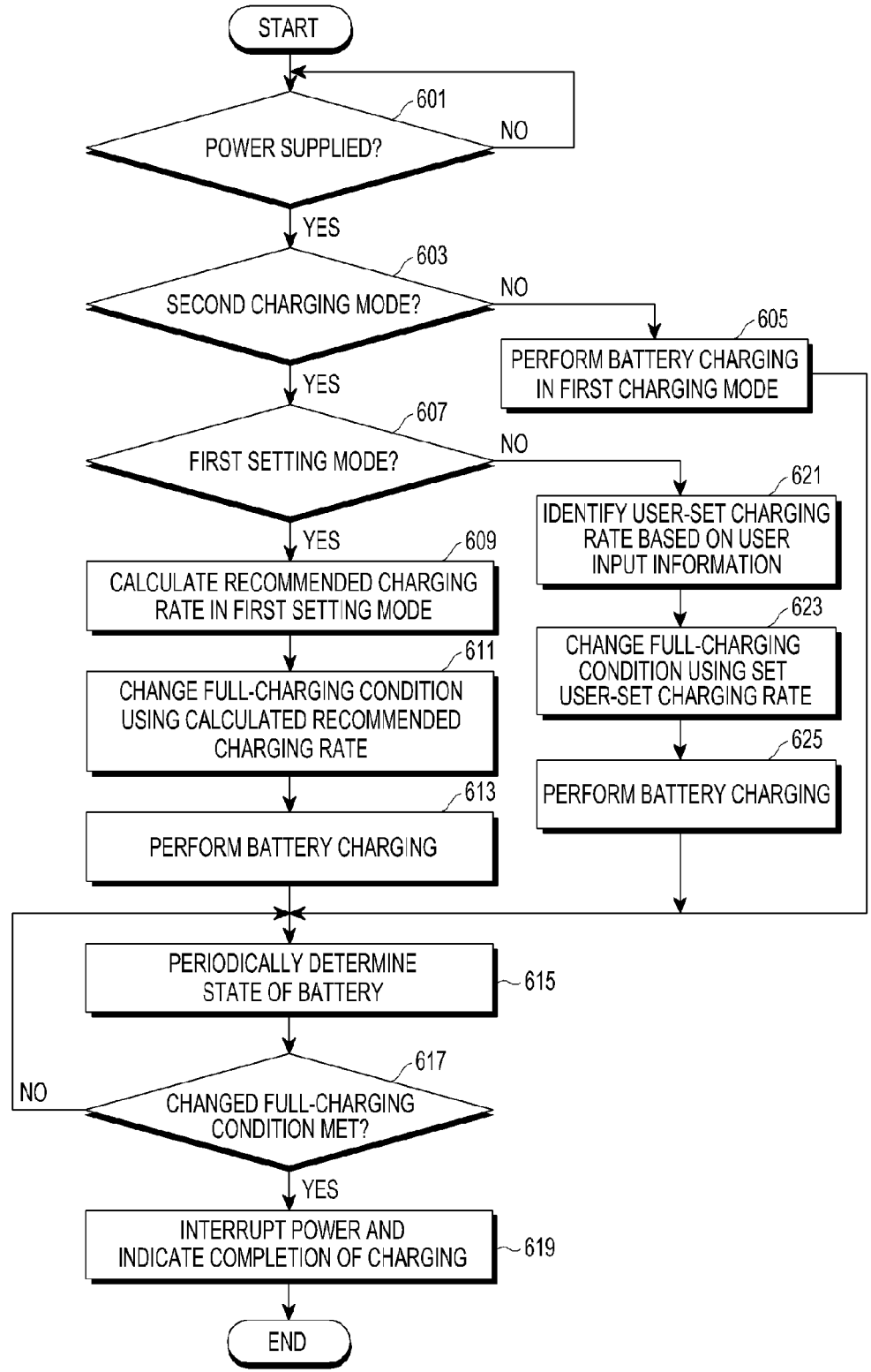
FIG. 6 illustrates an operation procedure of an electronic device according to various embodiments of the present disclosure.

FIG. 6 illustrates an operation procedure of an electronic device according to various embodiments of the present disclosure. Referring to FIG. 6, in operation 601, the electronic device determines whether power is supplied to the electronic device according to various embodiments of the present disclosure. If power is supplied to the battery, the electronic device performs operation 603; otherwise, if the power to the battery is interrupted, the electronic device performs operation 601 again, while waiting for power supply.

In operation 603, the electronic device determines whether a mode for battery charging is a first charging mode or a second charging mode. If the electronic device is in the second charging mode, the electronic device performs operation 607; otherwise, if the electronic device is not in the second charging mode, the electronic device performs operation 605.

In operation 605, the electronic device performs battery charging in the first charging mode. In the first charging mode, which is a normal mode, the battery may be charged at an initial full-charging condition (a set battery charging rate (e.g., 100%) or a battery charging rate set higher than a charging rate at a cutoff voltage).

In operation 607, the electronic device determines whether the first setting mode or the second setting mode is input from the user on the battery management screen. If the user inputs the first setting mode (a recommended charging rate mode), the electronic device switches the mode for battery charging to the first setting mode to perform operation 609. If the user inputs the second setting mode (a user-set charging rate mode), the electronic device switches the mode for battery charging to the second setting mode to perform operation 621.

In operation 609, the electronic device calculates a recommended charging rate in the first setting mode. The recommended charging rate may be calculated using Equation (1) provided above.

In operation 611, the electronic device changes the first full-charging condition using the calculated recommended charging rate.

In operation 613, the electronic device performs battery charging.

In operation 615, the electronic device periodically determines a state of a battery to identify at least one of a current battery capacity, whether external power is supplied to the battery, elapsed charging time, and battery temperature.

In operation 617, the electronic device determines whether the current battery capacity meets the changed second full-charging condition which may be, for example, the calculated recommended charging rate. If the current battery capacity does not meet the changed second full-charging condition, the electronic device performs operation 615; otherwise, if the current battery capacity meets the changed second full-charging condition, the electronic device performs operation 619.

In operation 619, the electronic device interrupts the external power supplied to the battery because the current battery capacity has reached the recommended charging rate. The electronic device may also display a notification message indicating on the battery management screen that charging has been completed.

In operation 621, the electronic device operates in the second setting mode to set a user-set charging rate based on user input information. In operation 623, the electronic device changes the first full-charging condition (e.g., the initial full-charging condition) using the set user-set charging rate.

In operation 625, the electronic device charges the battery according to the changed second full-charging condition, and may perform operations 615, 617, and 619 during battery charging.

FIGS. 7A and 7B, FIG. 8, and FIGS. 9A and 9B illustrate battery management screens corresponding to the first setting mode, displayed on the electronic device according to various embodiments of the present disclosure.

Figures 7A, 7B:
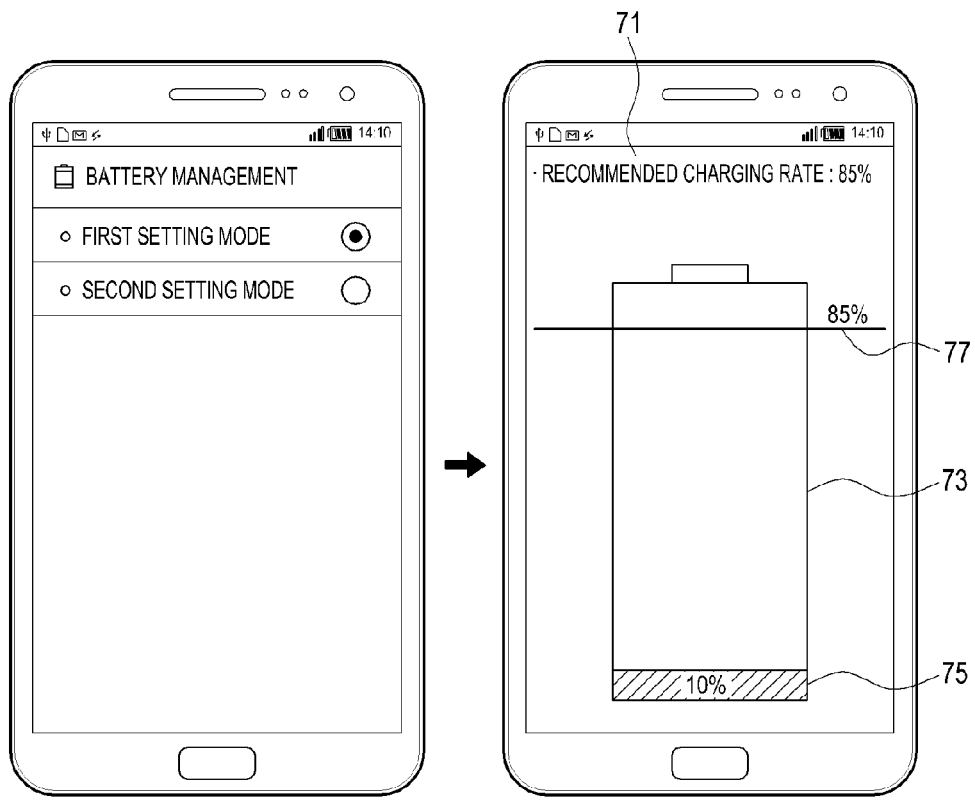
FIGS. 7A and 7B illustrate a battery management screen corresponding to a first setting mode displayed on an electronic device according to various embodiments of the present disclosure.

Referring to FIGS. 7A and 7B, according to various embodiments of the present disclosure, the electronic device executes an environment setting or battery management application to display the battery management screen on the display unit 240 of FIG. 2. The electronic device displays the setting mode(s) for battery charging on the battery management screen as illustrated in FIG. 7A. Once the user selects a setting mode, the electronic device displays information related to a battery state in the selected setting mode as illustrated in FIG. 7B. If the user selects the first setting mode, the electronic device displays text information 71 regarding a set recommended charging rate on the battery management screen, and displays a remaining battery capacity 75 and a recommended charging rate 77 on a battery image 73 to show a current battery state.

Figure 8:
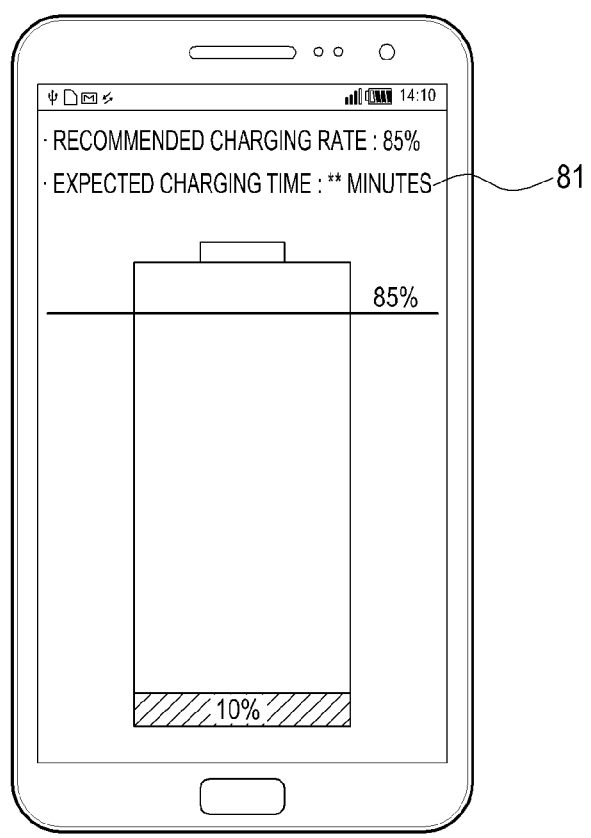
FIG. 8 illustrates a battery management screen corresponding to a first setting mode displayed on an electronic device according to various embodiments of the present disclosure.

Referring to FIG. 8, the electronic device further displays text information 81 regarding an expected charging time on the battery management screen on which the information related to the battery state is displayed as illustrated in FIGS. 7A and 7B.

Figures 9A, 9B:
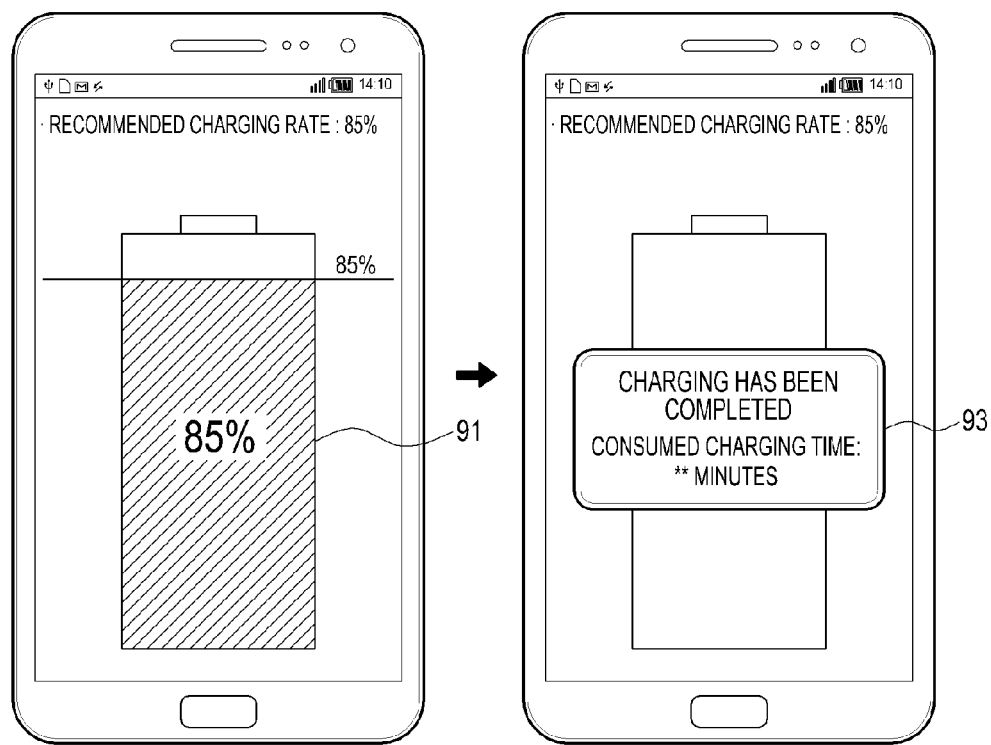
FIGS. 9A and 9B illustrate a battery management screen corresponding to a first setting mode displayed on an electronic device according to various embodiments of the present disclosure.

Referring to FIGS. 9A and 9B, the electronic device displays a charging progress of the battery when performing battery charging at the recommended charging rate. In other words, the electronic device may display, in real time or periodically, a current battery capacity by using image 91. When the battery capacity meets a full-charging condition, that is, the recommended charging rate, the electronic device displays a charging completion phrase and an elapsed charging time on the battery management screen by using a notification message 93 indicating charging has been completed, as illustrated in FIG. 9B.

FIGS. 10A, 10B, 11, 12, and 13 illustrate battery management screens corresponding to a second setting mode displayed on an electronic device, according to various embodiments of the present disclosure.

Figures 10A, 10B:
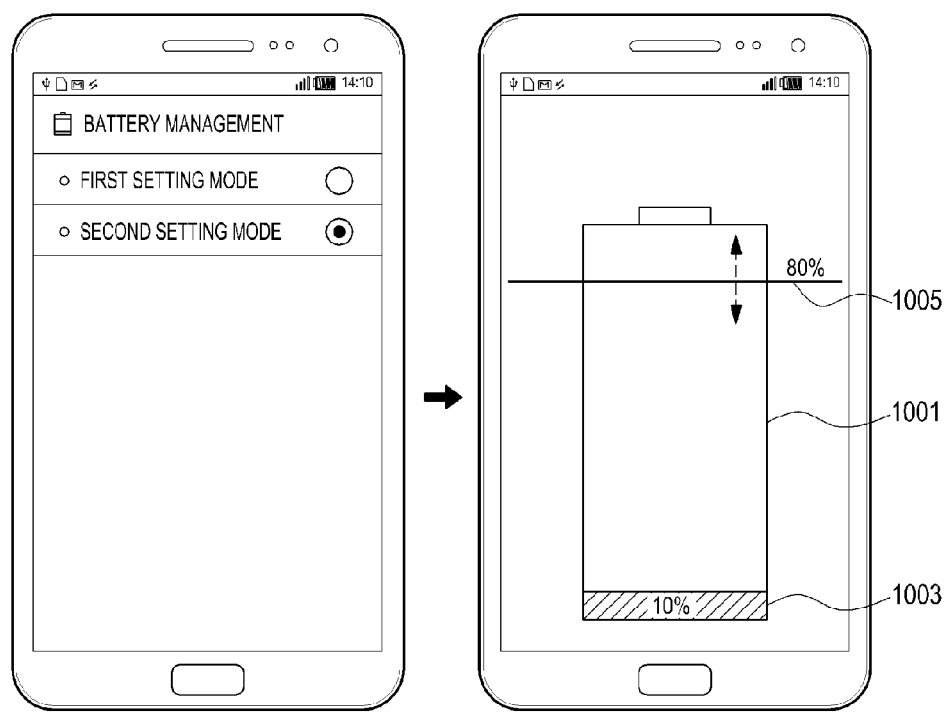
FIGS. 10A and 10B illustrate a battery management screen corresponding to a second setting mode displayed on an electronic device according to various embodiments of the present disclosure.

Referring to FIG. 10A, according to various embodiments of the present disclosure, the electronic device displays at least one setting modes for battery charging on the battery management screen. Once the user selects the displayed setting mode(s), the electronic device displays information related to a battery state in the selected setting mode as illustrated in FIG. 10B. If the user selects the second setting mode, the electronic device displays a battery image 1001 for user setting. The battery image 1001 may include the information related to the battery state such as, for example, present battery capacity 1003 and an adjustment bar 1005 for adjusting the battery charging rate. If the user adjusts the adjustment bar 1005, a charging rate corresponding to a position of the adjustment bar 1005 may be displayed.

Figure 11:
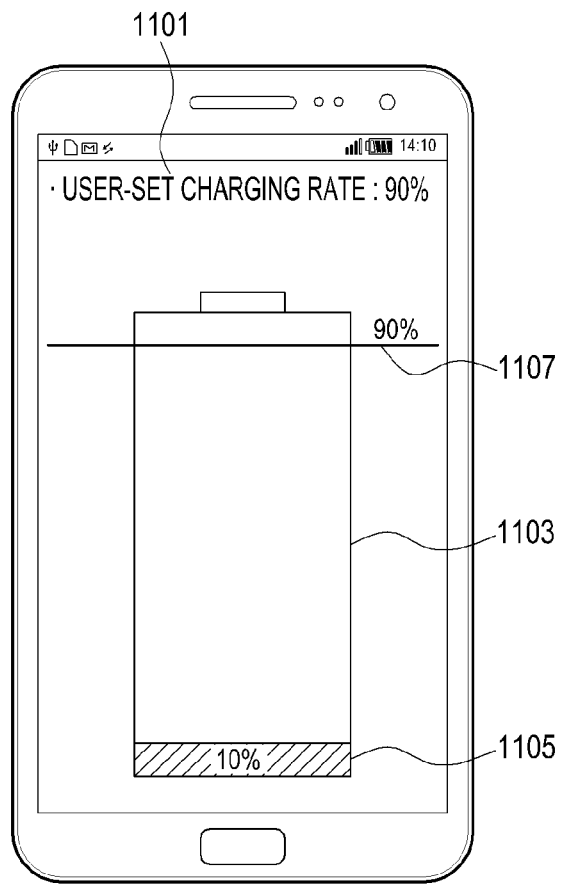
FIG. 11 illustrates a battery management screen corresponding to a second setting mode displayed on an electronic device according to various embodiments of the present disclosure.

Referring to FIG. 11, the electronic device displays text information 1101 regarding a user-set charging rate, a current battery capacity 1105 and the charging rate 1107, where the charging rate was set by the user, as described with respect to FIG. 10B.

Figure 12:
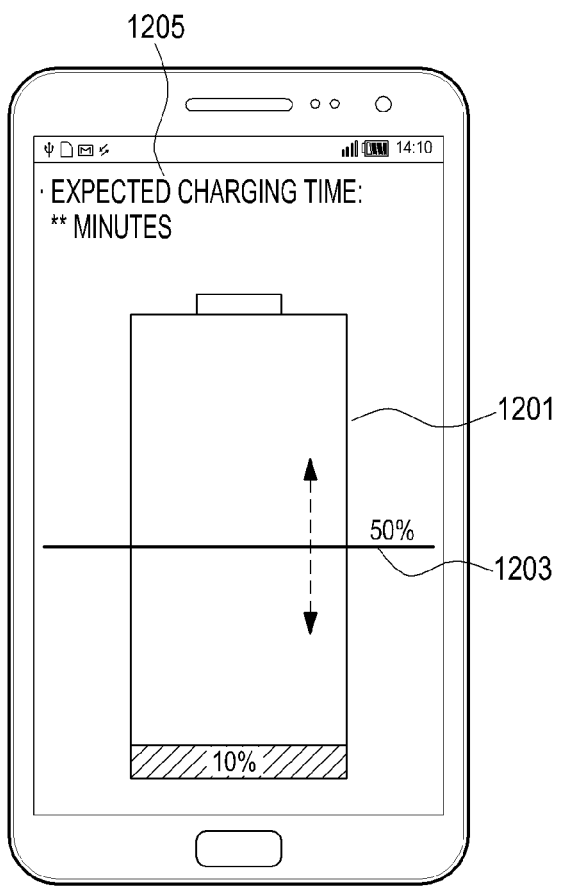
FIG. 12 illustrates a battery management screen corresponding to a second setting mode displayed on an electronic device according to various embodiments of the present disclosure.

Referring to FIG. 12, the electronic device displays a charging rate corresponding to a position adjusted by user via an adjustment bar 1203 displayed on a battery image 1201, and displays text information 1205 regarding an expected charging time.

Figure 13:
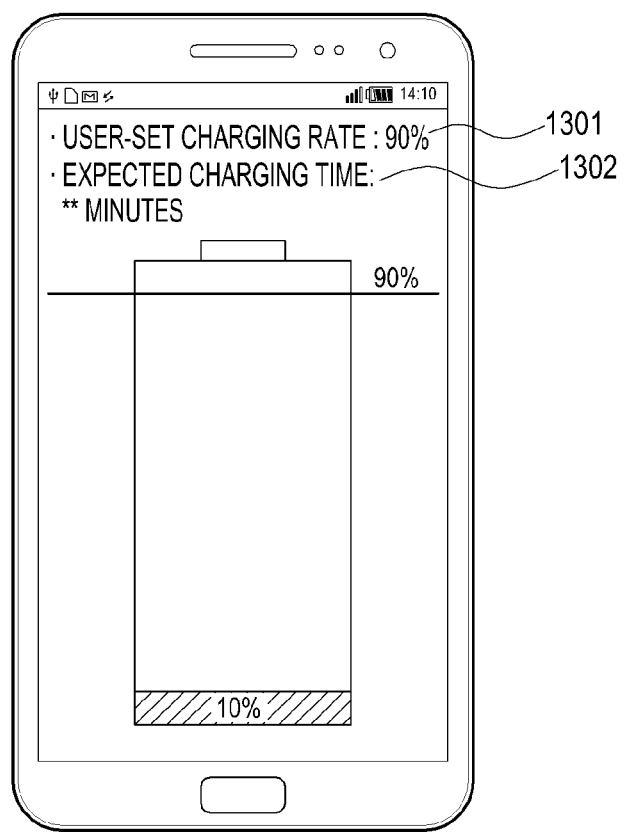
FIG. 13 illustrates a battery management screen corresponding to a second setting mode displayed on an electronic device according to various embodiments of the present disclosure.

Referring to FIG. 13, as the user selects a charging rate by adjusting the adjustment bar 1203 as illustrated in FIG. 12, the electronic device sets the charging rate to the user-set charging rate and displays text information 1301 regarding the user-set charging rate on the battery management screen. The electronic device may also display the text information 1302 regarding an expected charging time. The electronic device may also display battery charging progress during battery charging. The electronic device may display a notification message indicating completion of charging and the elapsed charging time on the battery management screen as illustrated in FIG. 9B.

Figure 14:
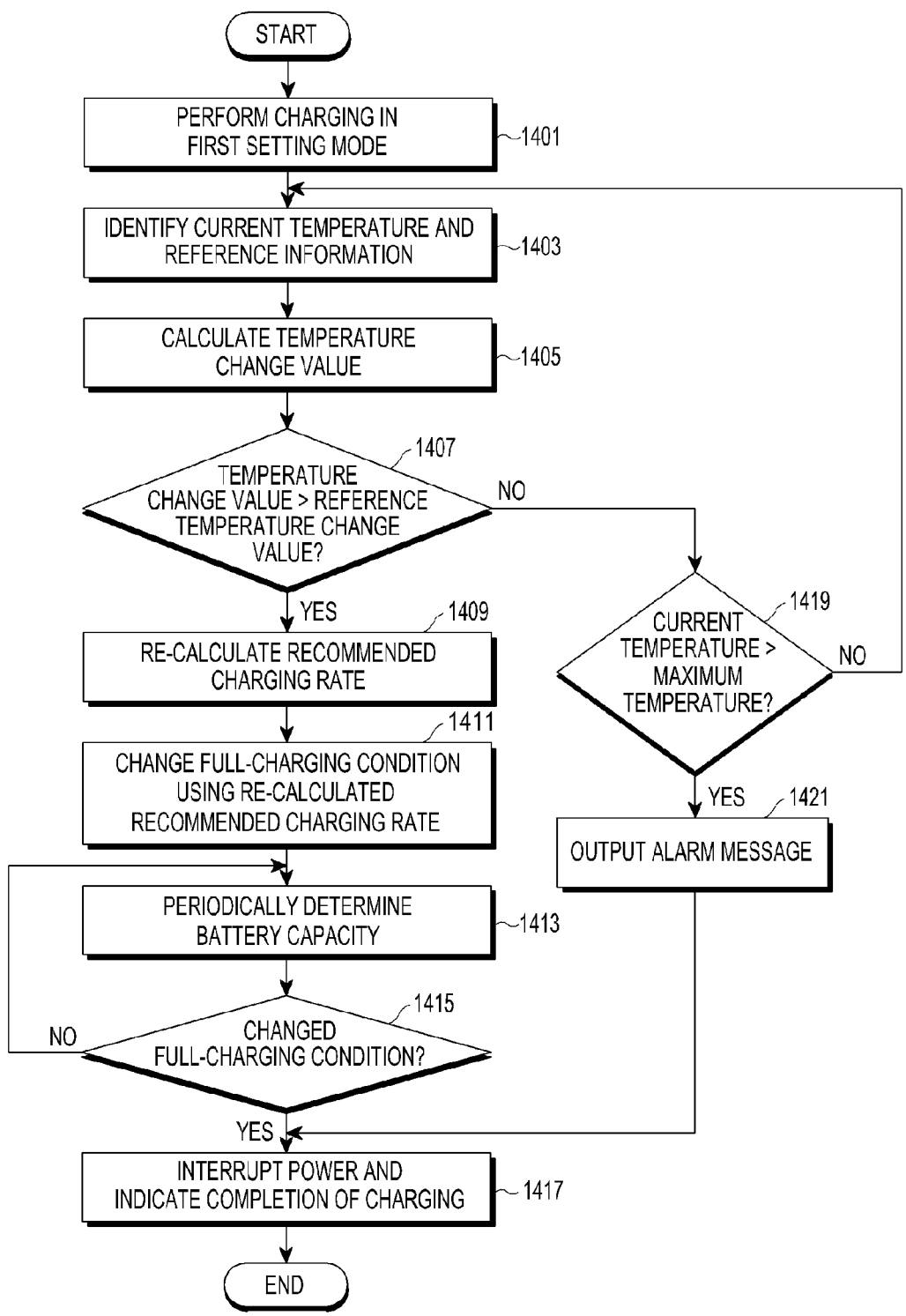
FIG. 14 illustrates an operation procedure of an electronic device according to various embodiments of the present disclosure.
Figure 15:
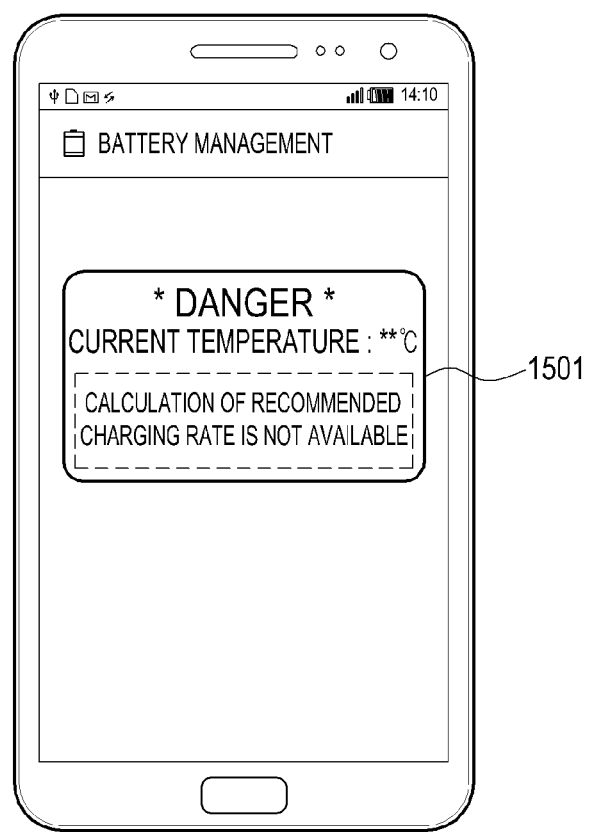
FIG. 15 illustrates a battery management screen displayed on an electronic device according to various embodiments of the present disclosure.

FIG. 14 illustrates an operation procedure of an electronic device according to various embodiments of the present disclosure, and FIG. 15 illustrates a battery management screen displayed on an electronic device according to various embodiments of the present disclosure.

Referring to FIGS. 14 and 15, in operation 1401, according to various embodiments of the present disclosure, the electronic device performs battery charging at a recommended charging rate. During battery charging, the electronic device may sense current battery temperature in operation 1403 and calculate a temperature change value that indicates a degree of temperature change of the battery by comparing the identified current battery temperature with a previous battery temperature to determine a temperature change of the battery in operation 1405.

In operation 1407, the electronic device determines whether the calculated temperature change value exceeds a reference temperature change value. The reference temperature change value is a threshold value that indicates the degree of temperature change of the battery. If the calculated temperature change value exceeds the reference temperature change value, the electronic device performs operation 1409; otherwise, if the calculated temperature change value does not exceed the reference temperature change value, the electronic device performs operation 1419.

The electronic device re-calculates a second charging rate because the calculated temperature change exceeds the reference temperature change in operation 1409, and changes a first full-charging condition (e.g., an initial full-charging condition) using the re-calculated recommended charging rate and performs battery charging according to the changed second full-charging condition in operation 1411.

In operation 1413, during battery charging, the electronic device periodically determines a state of the battery to identify at least one of current battery capacity, whether external power is supplied to the battery, elapsed charging time, and battery temperature.

In operation 1415, the electronic device determines whether the current battery capacity meets the changed second full-charging condition, for example, the calculated recommended charging rate. If the current battery capacity does not meet the changed second full-charging condition, the electronic device performs operation 1413; otherwise, if the current battery capacity meets the changed second full-charging condition, the electronic device performs operation 1417.

In operation 1417, the electronic device interrupts power supplied to the battery because the current battery capacity has reached the recommended charging rate. The electronic device may also display a notification message indicating that charging has been completed on the battery management screen.

If the calculated temperature change value does not exceed the reference temperature change value in operation 1407, the electronic device determines whether a current battery temperature value exceeds a maximum battery temperature in operation 1419. If the current battery temperature does not exceed the maximum battery temperature, the electronic device identifies again a current temperature of the battery in operation 1403.

If the current battery temperature exceeds the maximum battery temperature, the electronic device outputs an alarm message 1501 on the battery management screen in operation 1421 and interrupts power supplied to the battery in operation 1417. As illustrated in FIG. 15, the alarm message 1501 may indicate, for example, a phrase indicating a danger, a current battery temperature, a phrase indicating that calculation of a recommended charging rate is not available, and/or a phrase indicating that charging is not available.

Figure 16:
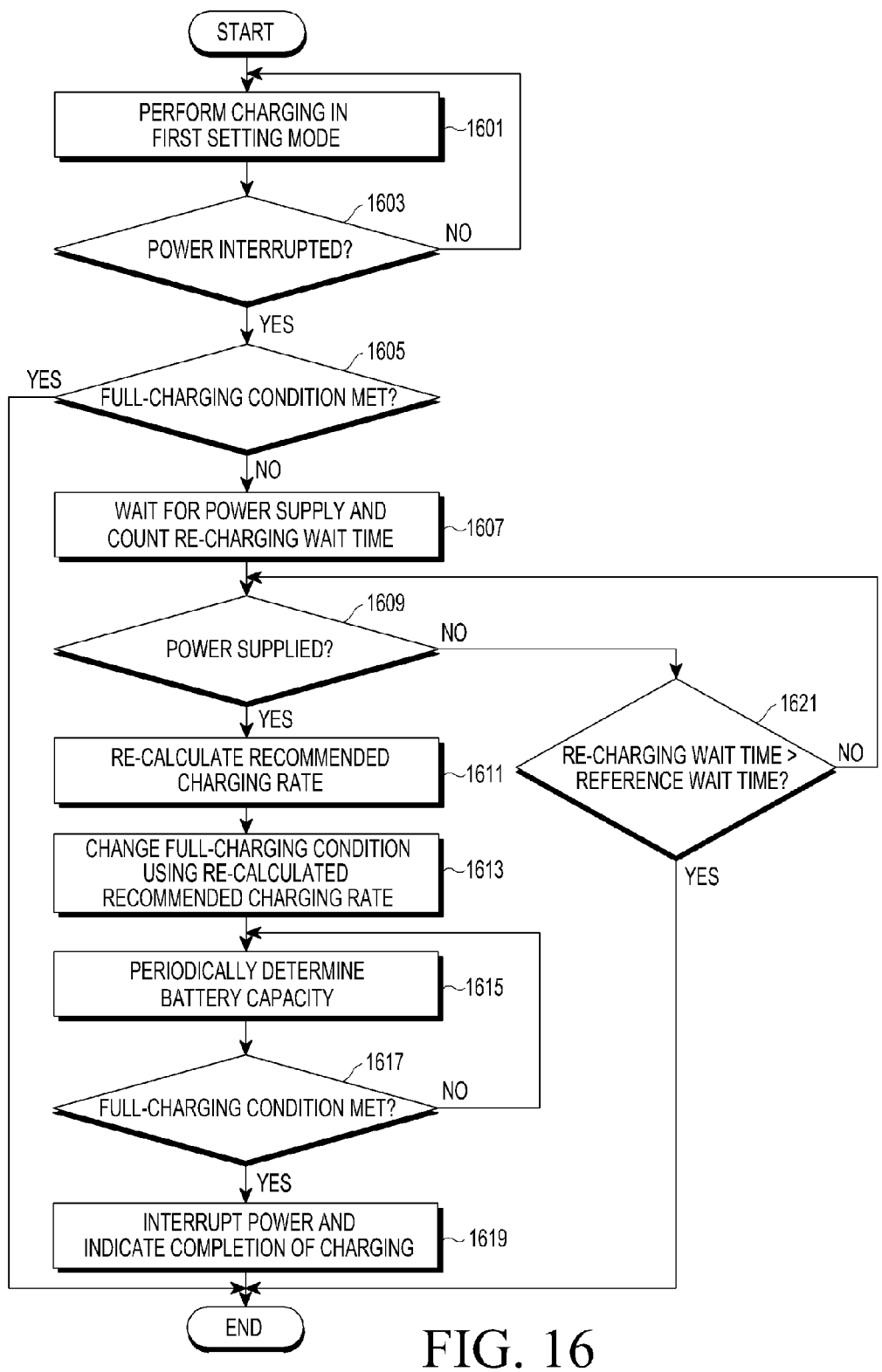
FIG. 16 illustrates an operation procedure of an electronic device according to various embodiments of the present disclosure.
Figures 17A, 17B:
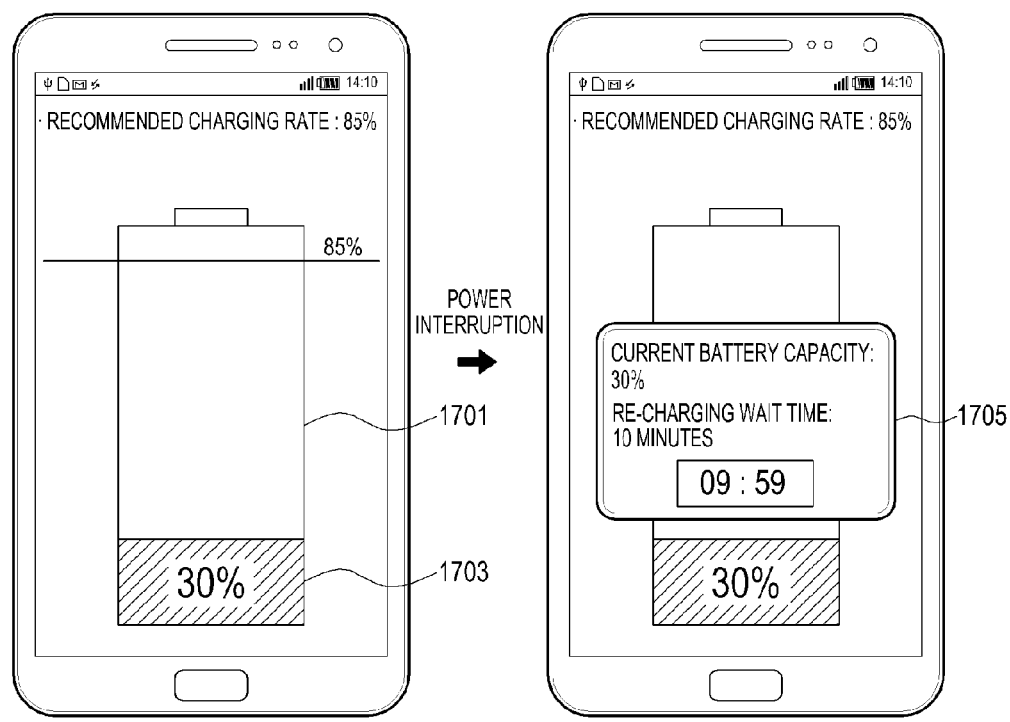
FIGS. 17A and 17B illustrate a battery management screen displayed on an electronic device according to various embodiments of the present disclosure.

FIG. 16 illustrates an operation procedure of an electronic device according to various embodiments of the present disclosure, and FIGS. 17A and 17B illustrate a battery management screen displayed on an electronic device according to various embodiments of the present disclosure.

Referring to FIGS. 16, 17A, and 17B, according to various embodiments of the present disclosure, in operation 1601, the electronic device performs battery charging at a recommended charging rate. In operation 1603, the electronic device determines whether power is interrupted during battery charging. If power is not interrupted, the electronic device continues battery charging and performs operation 1601.

If power is interrupted, the electronic device determines whether the current battery capacity meets the changed second full-charging condition, that is, the calculated recommended charging rate, in operation 1605. If the current battery capacity does not meet the changed second full-charging condition, the electronic device performs operation 1607; otherwise, if the current battery capacity meets the changed second full-charging condition, the electronic device terminates the battery charging operation. As illustrated in FIG. 17A, the electronic device displays a current battery capacity 1703 on a battery image 1701 displayed on the battery management screen.

In operation 1607, the electronic device continues waiting for power supply without terminating the battery charging operation and counts a wait time for re-charging, because power has been interrupted before completion of battery charging. If power is interrupted when a current battery capacity (e.g., 30%) fails to meet a changed second full-charging condition (e.g., a recommended charging rate of 85%) as illustrated in FIG. 17A, the electronic device displays a notification message 1705 indicating a current battery capacity (e.g., 30%), a reference wait time (e.g., 10 minutes), and/or a recharging wait time on the battery management screen. The electronic device displays a remaining recharging wait time in the form of a text or a timer image as illustrated in FIG. 17B.

In operation 1609, the electronic device determines whether power is supplied again. If the power has not yet been supplied, the electronic device determines whether the recharging wait time exceeds the reference wait time in operation 1621. If the recharging wait time exceeds the reference wait time, the electronic device terminates the battery charging operation; otherwise, if the recharging wait time does not exceed the reference wait time, the electronic device performs operation 1609.

In operation 1611, the electronic device recalculates a recommended charging rate because the power is supplied again. In operation 1613, the electronic device changes a full-charging condition (e.g., a previously changed full-charging condition) by using the recalculated recommended charging rate. Depending on an embodiment of the present disclosure, operations 1611 and 1613 may be omitted. According to various embodiments of the present disclosure, the electronic device may set a wait time for recalculation of the recommended charging rate, and if the power is supplied again within the set wait time, the electronic device may apply the calculated recommended charging rate and perform battery charging; otherwise, if the power is supplied after the set wait time, the electronic device may recalculate the recommended charging rate.

In operation 1615, the electronic device charges the battery according to the changed second full-charging condition and determines, in real time or periodically, a state of the battery during battery charging. The electronic device identifies at least one of a current battery capacity, power supply to the battery, an elapsed charging time, and a temperature of the battery, by determining the state of the battery.

In operation 1617, the electronic device determines whether the current battery capacity meets the changed second full-charging condition, for example, the recalculated recommended charging rate. If the current battery capacity does not meet the changed second full-charging condition, the electronic device performs operation 1615; otherwise, if the current battery capacity meets the changed second full-charging condition, the electronic device performs operation 1619.

In operation 1619, the electronic device interrupts power to the battery because the current battery capacity has reached the recalculated recommended charging rate. The electronic device displays a notification message indicating completion of charging on the battery management screen in operation 1619.

Figure 18:
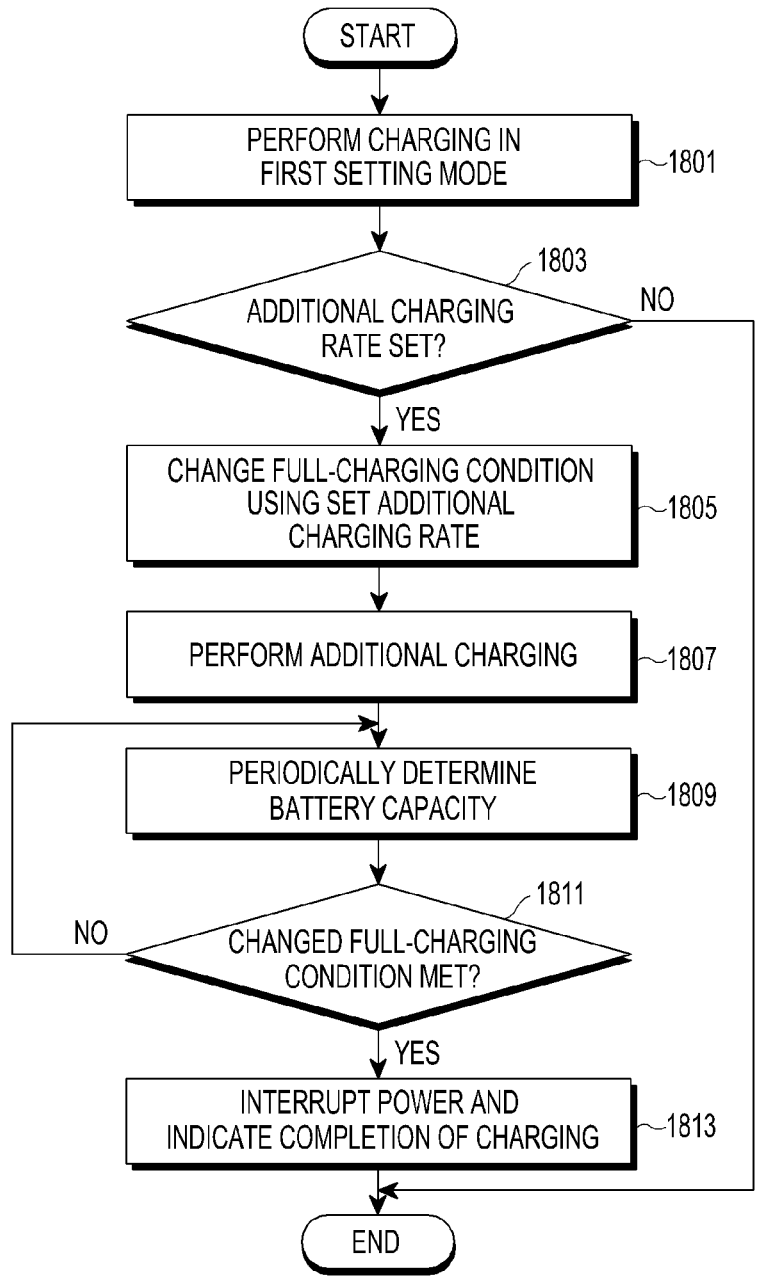
FIG. 18 illustrates an operation procedure of an electronic device according to various embodiments of the present disclosure.
Figure 19:
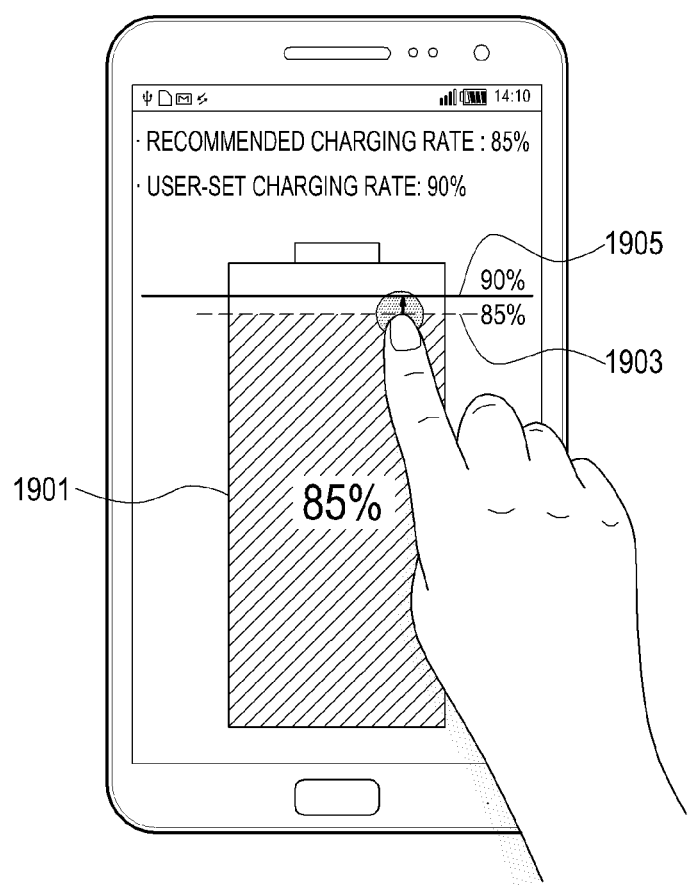
FIG. 19 illustrates a battery management screen displayed on an electronic device according to various embodiments of the present disclosure.

FIG. 18 illustrates an operation procedure of an electronic device according to various embodiments of the present disclosure, and FIG. 19 illustrates a battery management screen displayed on an electronic device according to various embodiments of the present disclosure.

Referring to FIGS. 18 and 19, according to various embodiments of the present disclosure, in operation 1801, the electronic device performs battery charging at a recommended charging rate.

In operation 1803, the electronic device determines whether an additional charging rate (for example, a third charging rate) is set. If the additional charging rate has not been set, the electronic device terminates the battery charging operation; otherwise, if the additional charging rate has been set, the electronic device performs operation 1805. As illustrated in FIG. 19, if the user adjusts an adjustment bar displayed on a battery image 1901 to adjust a battery capacity, the electronic device adjusts a previously set recommended charging rate (e.g., 85%) 1903 to a user-adjusted charging rate (e.g., 90%) 1905 and displays the user-adjusted charging rate 1905. The electronic device may update the adjusted charging rate 1905 to the new charging rate.

In operation 1805, the electronic device changes the full-charging condition (e.g., the previously changed full-charging condition) by using the set additional charging rate.

In operation 1807, according to various embodiments of the present disclosure, the electronic device further performs charging according to the changed second full-charging condition, if charging has been completed according to the full-charging condition before the additional changing rate is set. In addition, according to various embodiments of the present disclosure, the electronic device continues charging the battery according to the changed second full-charging condition, if charging has not been completed before the additional charging rate is set.

In operation 1809, the electronic device determines, in real time or periodically, determines a state of the battery during battery charging. The electronic device identifies at least one of a current battery capacity, whether external power is supplied to the battery, elapsed charging time, and battery temperature, by determining the state of the battery.

In operation 1811, the electronic device determines whether the current battery capacity meets the changed second full-charging condition, for example, the additional charging rate. If the current battery capacity does not meet the changed second full-charging condition, the electronic device performs operation 1809.

If the current battery capacity meets the changed second full-charging condition, the electronic device interrupts the power supplied to the battery in operation 1813 because the current battery capacity has reached the additional charging rate. The electronic device displays a notification message indicating completion of charging on the battery management screen in operation 1813.

Figure 20:
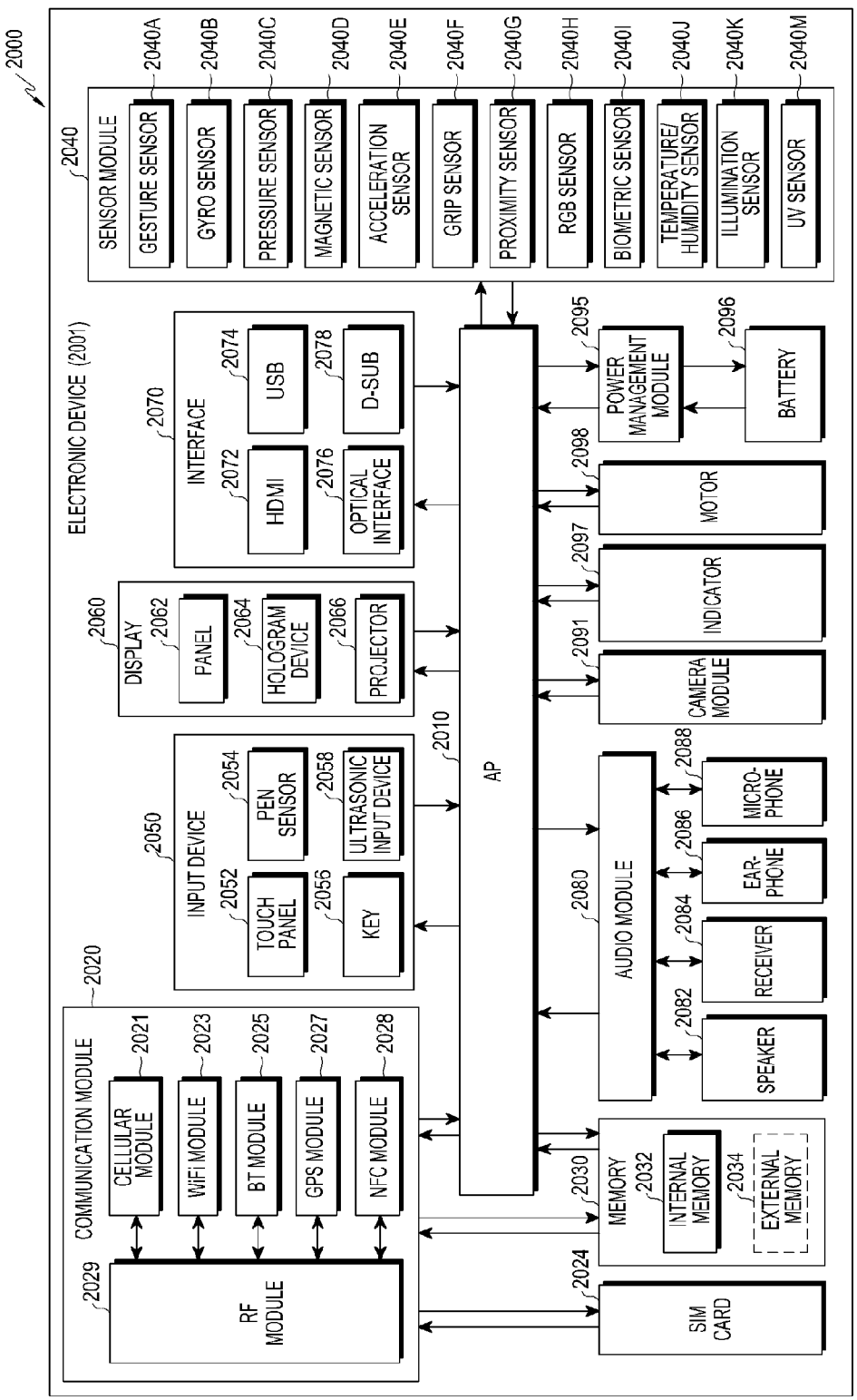
FIG. 20 is a block diagram illustrating a detailed structure of an electronic device according to an embodiment of the present disclosure.

FIG. 20 is a block diagram 2000 of an electronic device 2001 according to various embodiments of the present disclosure. The electronic device 2001 may include the entire electronic device 101 illustrated in FIG. 1 or a part of the electronic device 101 illustrated in FIG. 1. Referring to FIG. 20, the electronic device 2001 may include Application Processor (AP) 2010, a communication module 2020, a Subscriber Identification Module (SIM) card 2024, a memory 2030, a sensor module 2040, an input module 2050, a display 2060, an interface 2070, an audio module 2080, a camera module 2091, a power management module 2095, a battery 2096, an indicator 2097, and a motor 2098.

The AP 2010 may use an operating system (OS) or an application program in the, for example, memory 2030, and process various data including multimedia data, where the data may be stored, for example, in memory 2030. The AP 2010 may be implemented with, for example, a system on chip (SoC). According to an embodiment of the present disclosure, the AP 2010 may further include a graphics processor (not shown) and/or an image signal processor (not shown). The AP 2010 may include at least some of the elements illustrated in FIG. 20 (e.g., the cellular module 2021). The AP 2010 may execute instructions from, for example, memory 2030 to carry out appropriate functions.

The communication module 2020 may have a configuration that is the same as or similar to the communication module 170 illustrated in FIG. 1. The communication module 2020 may include, for example, the cellular module 2021, a WiFi module 2023, a Bluetooth (BT) module 2025, a global positioning system (GPS) module 2027, a near field communication (NFC) module 2028, and a radio frequency (RF) module 2029.

The cellular module 2021 may provide, for example, a voice call, a video call, a text service, or an Internet service over a communication network. According to an embodiment of this disclosure, the cellular module 2021 may identify and authenticate the electronic device 2001 in a communication network by using a subscriber identification module (e.g., the SIM card 2024). According to an embodiment of this disclosure, the cellular module 2021 performs at least one of functions that may be provided by the AP 2010. According to an embodiment of this disclosure, the cellular module 2021 may include a communication processor (CP).

At least one of the WiFi module 2023, the BT module 2025, the GPS module 2027, and the NFC module 2028 may include a processor for processing data transmitted and received by a corresponding module. According to some embodiment, at least some of the cellular module 2021, the WiFi module 2023, the BT module 2025, the GPS module 2027, and the NFC module 2028 may be included in one Integrated Chip (IC) or IC package.

The RF module 2029 may transmit and receive a communication signal. The RF module 2029 may include, for example, a transceiver, a power amp module (PAM), a frequency filter, a low noise amplifier (LNA), or an antenna. According to another embodiment of this disclosure, at least one of the cellular module 2021, the WiFi module 2023, the BT module 2025, the GPS module 2027, and the NFC module 2028 may transmit and receive RF signals through a separate RF module.

The SIM card 2024 may include a card including an SIM and/or an embedded SIM, and may include unique identification information (e.g., an integrated circuit card identifier (ICCID) or subscriber information (e.g., an International Mobile Subscriber Identity (IMSI)).

The memory 2030 (which may be similar to the memory 130) may include an internal memory 2032 and/or an external memory 2034. The internal memory 2032 may include at least one of volatile memory (e.g., Dynamic Random Access Memory (DRAM), Static RAM (SRAM), Synchronous Dynamic RAM (SDRAM), and non-volatile memory (e.g., One Time Programmable Read Only Memory (OTPROM), Programmable ROM (PROM), Erasable and Programmable ROM (EPROM), Electrically Erasable and Programmable ROM (EEPROM), mask ROM, flash ROM, NAND flash memory, or NOR flash memory), and a Solid State Drive (SSD)).

The external memory 2034 may further include flash drive such as, for example, Compact Flash (CF), Secure Digital (SD), micro-SD, mini-SD, eXtreme Digital (xD), a MultiMedia Card (MMC), or a memory stick. The external memory 2034 may be functionally and/or physically connected with the electronic device 2001 through various interfaces.

The sensor module 2040 measures physical quantity or senses an operation state of the electronic device 2001 to convert the measured or sensed information into an electric signal. The sensor module 2040 may include at least one of a gesture sensor 2040A, a gyro sensor 2040B, a pressure sensor 2040C, a magnetic sensor 2040D, an acceleration sensor 2040E, a grip sensor 2040F, a proximity sensor 2040G, a color sensor 2040H (e.g., RGB sensor), a biometric sensor 2040I, a temperature/humidity sensor 2040J, an illumination sensor 2040K, and a ultraviolet (UV) sensor 2040M. Additionally or alternatively, the sensor module 2040 may include an e-nose sensor (not shown), an electromyography (EMG) sensor (not shown), an electroencephalogram (EEG) sensor (not shown), an electrocardiogram (ECG) sensor (not shown), or a fingerprint sensor. The sensor module 2040 may further include a control circuit for controlling at least one sensor included therein. In some embodiment of the present disclosure, the electronic device 2001 may further include a processor configured to control the sensor module 2040 as part of or separately from the AP 2010 to control the sensor module 2040 during a sleep state of the AP 2010.

The input module 2050 may include a touch panel 2052, a (digital) pen sensor 2054, a key 2056, or an ultrasonic input device 2058. The touch panel 2052 may use at least one of a capacitive type, a resistive type, an IR type, or an ultrasonic type. The touch panel 2052 may further include a control circuit. The touch panel 2052 may further include a tactile layer to provide tactile reaction to the user.

The (digital) pen sensor 2054 may include a recognition sheet which is a part of the touch panel 2052 or a separate recognition sheet. The key 2056 may also include a physical button, an optical key, or a keypad. The ultrasonic input device 2058 senses ultrasonic waves generated in an input means for generating the ultrasonic waves through a microphone (e.g., the microphone 2088) and checks data corresponding to the sensed ultrasonic waves.

The display 2060 (e.g., the display module 160) may include a panel 2062, a hologram 2064, or a projector 2066. The panel 2062 may have a configuration that is the same as or similar to that of the display 160 of FIG. 1. The panel 2062 may be implemented to be flexible, transparent, or wearable. The panel 2062 may be configured with the touch panel 2052 in one module. The hologram 2064 shows a stereoscopic image in the air by using interference of light. The projector 2066 displays an image onto an external screen through projection of light. The screen may be positioned inside or outside the electronic device 2001. According to an embodiment of this disclosure, the display 2060 may further include a control circuit for controlling the panel 2062, the hologram 2064, or the projector 2066.

The interface 2070 may include a high-definition multimedia interface (HDMI) 2072, a universal serial bus (USB) 2074, an optical communication 2076, or a D-subminiature 2078. The interface 2070 may be included in the communication module 170 illustrated in FIG. 1. Additionally or alternatively, the interface 2070 may include a Mobile High-Definition Link (MHL) interface, an SD/MMC interface, or an infrared data association (IrDA) interface.

The audio module 2080 bi-directionally converts sound and an electric signal. At least one element of the audio module 2080 may be included in the I/O interface 150 illustrated in FIG. 1. The audio module 2080 processes sound information input or output through the speaker 2082, the receiver 2084, the earphone 2086, or the microphone 2088.

The camera module 2091 is a device capable of capturing a still image or video, and according to an embodiment of this disclosure, may include at least one image sensors (e.g., a front sensor or a rear sensor), a lens, an image signal processor (ISP), or a flash (e.g., an LED or a xenon lamp).

The power management module 2095 manages power of the electronic device 2001. According to an embodiment of this disclosure, the power management module 2095 may include a Power Management Integrated Circuit (PMIC), a charger IC, or a battery fuel gauge. The PMIC may have a wired and/or wireless charging scheme. The wireless charging scheme may include a magnetic-resonance type, a magnetic induction type, and an electromagnetic type. Wireless charging may further include an additional circuit such as, for example, a coil loop, a resonance circuit, and/or a rectifier. The battery gauge measures the remaining capacity of the battery 2096 or the voltage, current, or temperature of the battery 2096. The battery 2096 may include a rechargeable battery and/or a solar battery.

The indicator 2097 displays a particular state, for example, a booting state, a message state, or a charging state, of the electronic device 2001 or a part thereof (e.g., the AP 2010). The motor 2098 converts an electric signal into mechanical vibration or generates vibration or a haptic effect. Although not shown, the electronic device 2001 may include a processing device (e.g., a GPU) for supporting mobile TV. The processing device for supporting mobile TV may process media data according to a standard such as Digital Multimedia Broadcasting (DMB), Digital Video Broadcasting (DVB), or mediaFlo™.

Each of the foregoing elements described herein may include one or more components, and a name of the element may vary with a type of the electronic device 2001. The electronic device according to the present disclosure may include at least one of the foregoing elements, and some of the elements may be omitted therefrom or other elements may be further included therein. As some of the elements of the electronic device according to the present disclosure are coupled into one entity, the same function as those of the elements that have not been coupled may be performed.

Figure 21:
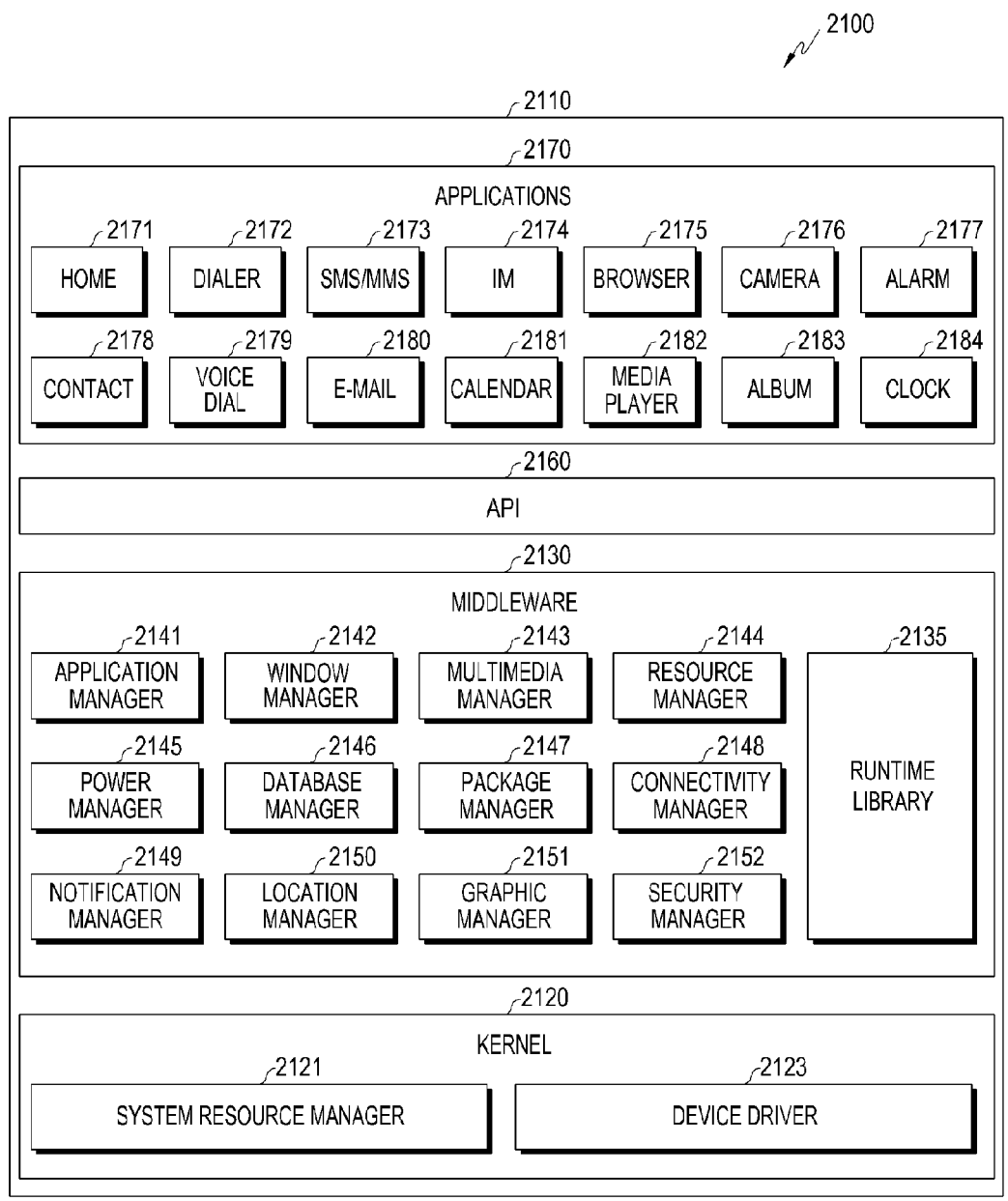
FIG. 21 is a block diagram illustrating a detailed structure of an electronic device according to various embodiments of the present disclosure.

FIG. 21 is a block diagram 2100 of a programming module 2110 according to various embodiments of the present disclosure. According to an embodiment of the present disclosure, a programming module 2110 (e.g., the program) may include an OS for controlling resources associated with an electronic device (e.g., the electronic device 101) and/or various applications (for example, the application program 147) executed on the OS. The OS may include Android, iOS, Windows, Symbian, Tizen, or Bada. Some electronic devices may have multiple OSs.

The programming module 2110 may include a kernel 2120, a middleware 2130, an application programming interface (API) 2160, and/or at least one application 2170. At least a part of the programming module 2110 may be preloaded on an electronic device or may be downloaded from a server (e.g., the server 106).

The kernel 2120 (e.g., the kernel 141 of FIG. 1) may include a system resource manager 2121 and/or a device driver 2123. The system resource manager 2121 may perform control, allocation, or retrieval of system resources. According to an embodiment of this disclosure, the system resource manager 2121 may include a process management unit, a memory management unit, or a file system. The device driver 2123 may include, for example, a display driver, a camera driver, a Bluetooth driver, a shared memory driver, a USB driver, a keypad driver, a WiFi driver, an audio driver, or an inter-process communication (IPC) driver.

The middleware 2130 may include functions that the application 2170 commonly requires or provide various functions to the application 2170 through the API 2160 to allow the application 2170 to efficiently use a limited system resource in an electronic device. According to an embodiment of this disclosure, the middleware 2130 may include at least one of a runtime library 2135, an application manager 2141, a window manager 2142, a multimedia manager 2143, a resource manager 2144, a power manager 2145, a database manager 2146, a package manager 2147, a connectivity manager 2148, a notification manager 2149, a location manager 2150, a graphic manager 2151, and a security manager 2152.

The runtime library 2135 may include a library module that can provide a new function when application 2170 is executed. The runtime library 2135 may provide functions relating to an I/O, memory management, or calculation operation.

The application manager 2141 manages the at least one application 2170. The window manager 2142 manages a GUI resource using a screen. The multimedia manager 2143 recognizes a format necessary for playing various media files and performs encoding or decoding on a media file by using a codec appropriate for a corresponding format. The resource manager 2144 manages a resource such as source code, memory, or storage space of the at least one application 2170.

The power manager 2145 manages a battery or power in operation with a basic input/output system (BIOS) and provides power information necessary for operation of the electronic device. The database manager 2146 performs a management operation to generate, search or change a database used for the at least one application 2170. The package manager 2147 manages the installation or update of an application distributed in a package file format.

The connectivity manager 2148 manages a wireless connection such as a WiFi or Bluetooth connection. The notification manager 2149 displays or notifies events such as arrival messages, appointments, and proximity alerts in a manner that is not disruptive to a user. The location manager 2150 manages location information of an electronic device. The graphic manager 2151 manages a graphic effect to be provided to a user or a user interface (UI) related thereto. The security manager 2152 provides a general security function necessary for system security or user authentication. According to an embodiment of the present disclosure, when an electronic device (e.g., the electronic device 101) has a call function, the middleware 2130 may further include a telephony manager for managing a voice or video call function of the electronic device.

The middleware 2130 may include a middleware module forming a combination of various functions of the above-mentioned internal elements. The middleware 2130 may provide modules specified according to types of OS so as to provide distinctive functions. Additionally, the middleware 2130 may delete some of existing elements or add new elements dynamically.

The API 2160 (e.g., the API 145) may be provided as a set of API programming functions with a different configuration according to the OS. In the case of Android or iOS, for example, one API set may be provided by each platform, and in the case of Tizen, two or more API sets may be provided.

The application 2170 (e.g., the application program 147) may include one or more applications capable of providing a function, for example, a home application 2171, a dialer application 2172, a short messaging service/multimedia messaging service (SMS/MMS) application 2173, an instant message (IM) application 2174, a browser application 2175, a camera application 2176, an alarm application 2177, a contact application 2178, a voice dial application 2179, an e-mail application 2180, a calendar application 2181, a media player application 2182, an album application 2183, a clock application 2184, a health care application (e.g., an application for measuring an exercise amount or a blood sugar), or an environment information providing application (e.g., an application for providing air pressure, humidity, or temperature information).

According to various embodiments of the present disclosure, the at least one application 2170 may include an application (hereinafter, an "information exchange application" for convenience) supporting information exchange between the electronic device (e.g., the electronic device 101) and an external electronic device (e.g., the electronic device 102 or 104). The information exchange application may include, for example, a notification relay application for transferring specific information to the external electronic device or a device management application for managing the external electronic device.

For example, the notification relay application may include a function for transferring notification information generated in another application (e.g., an SMS/MMS application, an e-mail application, a health care application, or an environment information application) of the electronic device to an external electronic device (e.g., the electronic device 104). The notification relay application may receive notification information from an external electronic device to provide the same to a user. The device management application may manage (e.g., install, remove, or update) at least one function (e.g., turn on/turn off of an external electronic device itself (or a part thereof) or control of brightness (or resolution) of a display, a service provided by an application operating in an external electronic device or provided by the external electronic device.

According to an embodiment of this disclosure, the at least one application 2170 may include an application (e.g., a health care application) designated according to an attribute of the external electronic device (e.g., a type of the electronic device being mobile medical equipment as the attribute of the electronic device). According to an embodiment of this disclosure, the application 2170 may include an application received from the external electronic device (e.g., the server 106 or the electronic device 102 or 104). According to an embodiment of this disclosure, the application 2170 may include a preloaded application or a third party application that may be downloaded from the server. Names of elements of the programming module 2110 according to the illustrated embodiment may vary depending on a type of an OS.

According to various embodiments of this disclosure, at least a part of the programming module 2110 may be implemented by software, firmware, hardware, or a combination of at least two of them. At least a part of the programming module 2110 may be implemented (e.g., executed) by a processor (e.g., the AP 2010). At least a part of the programming module 2110 may include a module, a program, a routine, sets or instructions, or a process for performing one or more functions.

A term "module" or "functional unit" used herein may mean, for example, a unit including one of or a combination of two or more of hardware, software, and firmware. The "module" may be interchangeably used with a unit, logic, a logical block, a component, or a circuit. The "module" or "functional unit" may be a portion of an integrated component. The "module" or "functional unit" may be a minimum unit or a portion thereof performing one or more functions. The "module" or "functional unit" may be implemented mechanically or electronically. For example, the "module" or "functional unit" according to the embodiments may include at least one of an application-specific integrated circuit (ASIC) chip, field-programmable gate arrays (FPGAs), and a programmable-logic device performing certain operations already known or to be developed.

At least a part of a device (for example, modules or functions thereof) or a method (for example, operations) according to various embodiments of the present disclosure may be implemented with instructions stored in a computer-readable storage medium in the form of a program module. When an instruction is executed by a processor (for example, the processor 120), the one or more processors may perform a function corresponding to the instruction. The computer-readable storage medium may be, for example, the memory 130.

The computer readable recording medium includes magnetic media such as hard disk, floppy disk, or magnetic tape, optical media such as compact disc read only memory (CD-ROM) or digital versatile disc (DVD), magneto-optical media such as floptical disk, and a hardware device such as ROM. RAM, flash memory storing and executing program commands. Further, the program instructions include a machine language code created by a complier and a high-level language code executable by a computer using an interpreter. The foregoing hardware device may be configured to be operated as at least one software module to perform an operation of the present disclosure, or vice versa.

Modules or programming modules according to various embodiments of the present disclosure may include one or more of the foregoing elements, have some of the foregoing elements omitted, or further include additional other elements. Operations performed by the modules, the programming modules or other elements may be executed in a sequential, parallel, repetitive and/or heuristic manner. Also, some of the operations may be executed in different order or omitted, or may have additional different operations.

According to various embodiments of the present disclosure, a computer-readable recording medium having recorded thereon a program to be executed on a computer, in which the program includes an executable command, when executed by a processor, for causing the processor to determine a second charging rate that is lower than a first charging rate set for the battery according to a battery charging condition and to charge the battery at the determined second charging rate.

According to various embodiments of the present disclosure, a computer-readable recording medium having recorded thereon a program to be executed on a computer, in which the program comprises an executable command, when executed by a processor, for causing the processor to display a battery management screen for adjusting a charging rate of the battery, to adjust the charging rate of the battery displayed on the battery management screen according to a user input, to set the adjusted charging rate to a second charging rate lower than the first charging rate, and to charge the battery at the set second charging rate.

As is apparent from the foregoing description, according to various embodiments of the present disclosure, the electronic device manages charging of the battery to charge the battery at a second charging rate lower than a first charging rate, thereby reducing a battery charging time or battery damage and thus preventing reduction of a battery capacity.

The embodiments disclosed herein have been provided for description and understanding of disclosed technical matters, and are not intended to limit the scope of the present disclosure. Therefore, it should be construed that the scope of the present disclosure includes any change or other various embodiments based on the technical spirit of the present disclosure.

What is claimed is:

1. A mobile electronic device comprising:
   a battery;
   a display; and
   a processor configured to:
      when power is applied to the battery, control charging the battery to a second charging percentage that is lower than a first charging rate percentage indicating a fully charged state of the battery that was previously set;
      display the second charging percentage on the display; and
      when a current charging percentage of the battery reaches the second charging percentage, control to stop charging the battery.

2. The mobile electronic device of claim 1, wherein the second charging percentage is determined based on a temperature sensed by the mobile electronic device.

3. The mobile electronic device of claim 2, wherein the processor identifies a current temperature of the battery from the sensed temperature and determines the second charging percentage by using at least one of a battery charging percentage when a substantially constant charging current changes to a non-constant charging current, a battery charging percentage at a full-charging cutoff voltage, and the identified current temperature of the battery.

4. The mobile electronic device of claim 1, wherein the processor displays at least one of information related to the charging of the battery, information related to an expected charging time, and information related to an elapsed charging time.

5. The mobile electronic device of claim 1, wherein when a temperature of the battery is changed by a reference temperature change value or more during the charging of the battery, the processor changes the second charging percentage according to the changed temperature of the battery and charges the battery to the changed second charging percentage.

6. The mobile electronic device of claim 1, wherein the processor interrupts power supplied to the battery if a current temperature of the battery exceeds a set maximum temperature.

7. The mobile electronic device of claim 1, wherein:
when the power supplied to the battery is interrupted before the battery is at the second charging percentage rate, the processor switches to a power supply wait state, and
when the power to the battery is available in the power supply wait state, the processor determines the second charging percentage and resumes charging the battery to the determined second charging percentage.

8. The mobile electronic device of claim 1, wherein during the charging of the battery, the processor receives, from a user, an input of a third charging percentage higher than the second charging percentage through adjustment of a charging percentage rate of the battery displayed on a battery management screen, and further charges the battery to the input third charging percentage.

9. A mobile electronic device comprising:
a battery;
a display; and
a processor configured to:
display a battery management screen for adjusting a charging percentage of the battery;
adjust the charging percentage of the battery displayed on the battery management screen when a user input is detected on the display;
control charging the battery to a second charging percentage lower than a first charging percentage indicating a fully charged state of the battery that was previously set; and
control to stop charging the battery when a current percentage of the battery reaches the second charging percentage.

10. The mobile electronic device of claim 9, wherein the processor displays at least one of information related to the charging of the battery, information related to an expected charging time, and information related to an elapsed charging time on a battery management screen when charging the battery at the second charging percentage.

11. A battery management method for a mobile electronic device, comprising:
controlling charging a battery to a second charging percentage that is lower than a first charging percentage indicating a fully charged state of the battery that was previously set when power is applied to the battery;
controlling display of the second charging percentage on a display of the mobile electronic device; and
controlling to stop charging the battery when a current charging percentage of the battery reaches the second charging percentage.

12. The battery management method of claim 11, further comprising:
determining the second charging percentage using a temperature sensed by the mobile electronic device; and
displaying at least one of information related to the charging of the battery, information related to an expected charging time, and information related to an elapsed charging time.

13. The battery management method of claim 11, further comprising:
sensing a battery temperature using at least one sensor mounted in the mobile electronic device.

14. The battery management method of claim 11, wherein controlling charging the battery to the second charging percentage comprises:
identifying a current temperature of the battery from a sensed temperature; and
controlling charging the battery to the second charging percentage by using at least one of a battery charging percentage when a charging current is changed, a battery charging percentage at a full-charging cutoff voltage, and a current battery temperature.

15. The battery management method of claim 11, wherein controlling charging the battery to the second charging percentage comprises:
changing the second charging percentage according to a changed temperature of the battery when the temperature of the battery is changed by a reference temperature change value or more during the charging of the battery; and
controlling charging the battery to the changed second charging percentage; and
controlling to stop charging the battery when a current charging percentage of the battery reaches the second charging percentage.

16. The battery management method of claim 11, wherein controlling charging the battery to the second charging percentage comprises:
switching to a power supply wait state when the power supplied to the battery is interrupted when a battery capacity is not at the second charging percentage;
resuming charging the battery when the power is available to charge the battery in the power supply wait state; and
controlling charging the battery to the second charging percentage.

17. The battery management method of claim 11, wherein controlling charging the battery to the second charging percentage comprises:
receiving, from a user, an input of a third charging percentage higher than the second charging percentage through adjustment of a charging percentage of the battery displayed on a battery management screen during the charging of the battery; and
further controlling charging the battery to the input third charging percentage.

18. A battery management method for a mobile electronic device, comprising:
displaying a battery management screen for adjusting a charging percentage of the battery on a display of the mobile electronic device;
adjusting the charging percentage of the battery displayed on the battery management screen when a user input is detected on the mobile electronic device;

setting the adjusted charging percentage to a second charging percentage lower than a first charging percentage indicating a fully charged state of the battery that was previously set;

controlling charging the battery to the set second charging percentage; and controlling to stop charging the battery when a current charging percentage of the battery reaches the second charging percentage.

19. The battery management method of claim 18, further comprising:

displaying at least one of information related to the charging of the battery, information related to an expected charging time, and information related to an elapsed charging time on the battery management screen.

20. A computer-readable recording medium having recorded thereon a program to be executed on a computer, wherein the program comprises an executable command, when executed by a processor, for causing the processor to:

control charging a battery to a second charging percentage that is lower than a first charging percentage indicating a fully charged state of the battery that was previously set for the battery when a power is applied to the battery, and control to stop charging when a current charging percentage of the battery reaches the second charging percentage.

21. A computer-readable recording medium having recorded thereon a program to be executed on a computer, wherein the program comprises an executable command, when executed by a processor, for causing the processor to:

display a battery management screen for adjusting a charging percentage of the battery, adjust the charging percentage of the battery displayed on the battery management screen when a user input is detected, set the adjusted charging percentage to a second charging percentage lower than a first charging percentage indicating a fully charged state of the battery that was previously set, control charging the battery to the second charging percentage, and control to stop charging the battery when a current charging percentage of the battery reaches the second charging percentage.

* * * * *